US009406056B2

(12) United States Patent
MacKay et al.

(10) Patent No.: US 9,406,056 B2
(45) Date of Patent: Aug. 2, 2016

(54) PARKING METER WITH CONTACTLESS PAYMENT

(75) Inventors: George Allan MacKay, New Glasgow (CA); Gregory Emile Chauvin, Brookside (CA); Adrian Ignatius O'Neil, New Glasgow (CA)

(73) Assignee: J.J. MACKAY CANADA LIMITED (CA)

( * ) Notice: Subject to any disclaimer, the term of this patent is extended or adjusted under 35 U.S.C. 154(b) by 0 days.

(21) Appl. No.: 13/546,918

(22) Filed: Jul. 11, 2012

(65) Prior Publication Data

US 2012/0292385 A1 Nov. 22, 2012

(30) Foreign Application Priority Data

Mar. 3, 2011 (CA) .................................. 2733110
Oct. 28, 2011 (CA) .................................. 2756489
Mar. 2, 2012 (WO) ................ PCT/CA2012/000191

(51) Int. Cl.
*G06Q 30/02* (2012.01)
*G06Q 20/18* (2012.01)
*G07F 17/24* (2006.01)
*G06Q 20/32* (2012.01)
*G06Q 20/34* (2012.01)

(52) U.S. Cl.
CPC ............ *G06Q 20/18* (2013.01); *G06Q 20/3278* (2013.01); *G06Q 20/352* (2013.01); *G07F 17/248* (2013.01); *Y04S 50/12* (2013.01); *Y10T 29/49826* (2015.01)

(58) Field of Classification Search
USPC ............................. 235/33, 375, 383, 384, 435
See application file for complete search history.

(56) References Cited

U.S. PATENT DOCUMENTS

| 480,108 | A | 8/1892 | Loch | 232/62 |
|---|---|---|---|---|
| 1,189,991 | A | 7/1916 | Mugler | 70/120 |
| 1,445,771 | A | 2/1923 | Keplinger | |
| 1,818,568 | A | 8/1931 | Melick | 194/203 |
| D100,875 | S | 8/1936 | Michaels | |
| D101,237 | S | 9/1936 | Miller | |
| D107,577 | S | 12/1937 | McGay | D10/42 |
| 2,118,318 | A | 5/1938 | Magee | 194/84 |
| D112,677 | S | 12/1938 | Broussard et al. | |
| 2,161,046 | A | 6/1939 | Hitzeman | 194/205 |

(Continued)

FOREIGN PATENT DOCUMENTS

| AU | 4035701 | 9/2001 | ............. G07F 17/24 |
|---|---|---|---|
| CA | 2233931 | 4/1997 | ............. G08G 1/14 |

(Continued)

OTHER PUBLICATIONS

International Search Report, PCT/US2010/047907, dated Apr. 26, 2011 (3 pgs).

(Continued)

*Primary Examiner* — Michael G Lee
*Assistant Examiner* — David Tardif
(74) *Attorney, Agent, or Firm* — Hayes Soloway P.C.

(57) ABSTRACT

A parking meter is described that comprises components for providing parking meter functionality and a display for displaying parking information and a metal housing for protecting the parking meter components from an environment that has a display aperture through which the display is visible. The parking meter also comprises an antenna for a contactless payment reader arranged in or on the parking meter in close proximity to the display.

30 Claims, 9 Drawing Sheets

(56) References Cited

U.S. PATENT DOCUMENTS

| | | | |
|---|---|---|---|
| 2,229,183 A | 1/1941 | Mitchell | 194/277 |
| 2,261,353 A | 11/1941 | Gaetano | 70/120 |
| 2,289,838 A | 7/1942 | Herschede et al. | 194/226 |
| D152,294 S | 1/1949 | Siegel et al. | D20/10 |
| D154,716 S | 8/1949 | Simpson | D10/42 |
| 2,483,805 A | 10/1949 | Broussard et al. | 232/1 |
| 2,495,784 A | 1/1950 | Starts | |
| 2,546,433 A | 3/1951 | Dick | 368/6 |
| 2,547,272 A | 4/1951 | Lawson et al. | 116/282 |
| 2,550,433 A | 4/1951 | Tichenor | 224/1 |
| D166,059 S | 2/1952 | Yoss | D10/42 |
| 2,594,388 A | 4/1952 | Broussard | 194/1 |
| 2,595,124 A | 4/1952 | Campbell | 250/27 |
| D166,753 S | 5/1952 | Jones | D10/42 |
| 2,596,122 A | 5/1952 | Broussard | 194/101 |
| 2,596,123 A | 5/1952 | Broussard | 194/1 |
| 2,596,124 A | 5/1952 | Broussard | 368/90 |
| 2,599,881 A | 6/1952 | Woodruff | 368/92 |
| 2,613,792 A | 10/1952 | Broussard | 194/72 |
| 2,613,871 A | 10/1952 | Broussard et al. | 232/16 |
| 2,618,371 A | 11/1952 | Broussard | 194/84 |
| 2,633,960 A | 4/1953 | Broussard | 194/72 |
| D181,359 S | 11/1957 | Jones | D10/42 |
| 2,818,371 A | 12/1957 | Wessinger | 167/93 |
| 2,822,682 A | 2/1958 | Sollenberger | 70/158 |
| 2,832,506 A | 4/1958 | Hatcher | 221/103 |
| 2,956,525 A | 10/1960 | Blauvelt | 109/59 |
| 2,985,978 A | 5/1961 | Breen et al. | 40/333 |
| 2,988,191 A | 6/1961 | Grant | 194/1 |
| 2,995,230 A | 8/1961 | Moody et al. | 194/9 |
| 3,018,615 A | 1/1962 | Minton et al. | 368/7 |
| 3,056,544 A | 10/1962 | Sollenberger et al. | 232/16 |
| D200,216 S | 2/1965 | Broussard | D52/3 |
| 3,183,411 A | 5/1965 | Palfi | 317/123 |
| 3,199,321 A | 8/1965 | Sollenberger | 70/1.5 |
| 3,204,438 A | 9/1965 | Sollenberger | 70/417 |
| 3,208,061 A | 9/1965 | Gervasi et al. | 340/539.31 |
| 3,262,540 A | 7/1966 | Sollenberger et al. | 194/72 |
| 3,272,299 A | 9/1966 | Sollenberger | 194/2 |
| 3,324,647 A | 6/1967 | Jedynak | 368/6 |
| 3,373,856 A | 3/1968 | Kusters et al. | 194/100 |
| 3,438,031 A | 4/1969 | Fathauer | 343/8 |
| 3,486,324 A | 12/1969 | Andersson | 368/90 |
| 3,519,113 A | 7/1970 | Arzig et al. | 194/2 |
| 3,535,870 A | 10/1970 | Mitchell | 58/142 |
| 3,565,283 A | 2/1971 | Sciacero et al. | 221/197 |
| 3,637,277 A | 1/1972 | Krug et al. | 312/217 |
| 3,666,067 A | 5/1972 | Kaiser | 194/225 |
| 3,721,463 A | 3/1973 | Attwood et al. | 287/20.3 |
| 3,941,989 A | 3/1976 | McLaughlin et al. | 235/156 |
| 3,975,934 A | 8/1976 | Babai et al. | 70/120 |
| 3,982,620 A | 9/1976 | Kortenhaus | 194/1 N |
| 3,991,595 A | 11/1976 | Bahry et al. | 70/120 |
| 3,999,372 A | 12/1976 | Welch et al. | 58/142 |
| 4,031,991 A | 6/1977 | Malott | 194/1 R |
| 4,043,117 A | 8/1977 | Maresca et al. | 58/142 |
| 4,237,710 A | 12/1980 | Cardozo | 70/108 |
| 4,248,336 A | 2/1981 | Fiedler | 194/97 |
| 4,249,648 A | 2/1981 | Meyer | 194/102 |
| 4,264,963 A | 4/1981 | Leach | 364/707 |
| 4,306,219 A | 12/1981 | Main et al. | 340/825.54 |
| 4,317,180 A | 2/1982 | Lies | 364/707 |
| 4,317,181 A | 2/1982 | Teza et al. | 364/707 |
| 4,323,847 A | 4/1982 | Karbowski | 324/327 |
| 4,379,334 A | 4/1983 | Feagins, Jr. et al. | 364/467 |
| 4,409,665 A | 10/1983 | Tubbs | 364/707 |
| 4,432,447 A | 2/1984 | Tanaka | 194/100 |
| 4,460,080 A | 7/1984 | Howard | 194/100 A |
| 4,474,281 A | 10/1984 | Roberts et al. | 194/1 N |
| 4,479,191 A | 10/1984 | Nojima et al. | 364/707 |
| 4,483,431 A | 11/1984 | Pratt | 194/97 |
| D278,689 S | 5/1985 | Jupe | D10/42 |
| 4,574,936 A | 3/1986 | Klinger | 194/318 |
| 4,639,021 A | 1/1987 | Hope | 292/7 |
| 4,678,994 A | 7/1987 | Davies | 324/236 |
| 4,742,903 A | 5/1988 | Trummer | 194/317 |
| 4,749,074 A | 6/1988 | Ueki et al. | 194/317 |
| D296,795 S | 7/1988 | Bouve | D20/10 |
| 4,763,769 A | 8/1988 | Levasseur | 194/217 |
| 4,809,838 A | 3/1989 | Houserman | 194/317 |
| 4,812,805 A | 3/1989 | Lachat et al. | 340/825.05 |
| 4,823,928 A | 4/1989 | Speas | |
| 4,825,425 A | 4/1989 | Turner | 368/7 |
| 4,827,206 A | 5/1989 | Speas | 323/299 |
| 4,845,484 A | 7/1989 | Ellsberg | 340/825.35 |
| 4,848,556 A | 7/1989 | Shah et al. | 194/212 |
| 4,851,987 A | 7/1989 | Day | 364/200 |
| 4,872,149 A | 10/1989 | Speas | 368/90 |
| 4,875,598 A | 10/1989 | Dahl | 221/4 |
| 4,880,097 A | 11/1989 | Speas | 194/239 |
| 4,880,406 A | 11/1989 | Van Horn et al. | 464/38 |
| 4,895,238 A | 1/1990 | Speas | 194/319 |
| 4,951,799 A | 8/1990 | Xai | 194/317 |
| 4,967,895 A | 11/1990 | Speas | 194/200 |
| 4,976,630 A | 12/1990 | Schuder et al. | 439/260 |
| 4,989,714 A | 2/1991 | Abe | 194/317 |
| 5,027,935 A | 7/1991 | Berg et al. | 194/318 |
| D319,077 S | 8/1991 | Arato et al. | D20/6 |
| 5,060,777 A | 10/1991 | Van Horn et al. | 194/317 |
| 5,065,156 A | 11/1991 | Bernier | 340/932.2 |
| 5,076,414 A | 12/1991 | Kimoto | 194/317 |
| 5,088,073 A | 2/1992 | Speas | 368/90 |
| 5,109,972 A | 5/1992 | Van Horn et al. | 194/217 |
| 5,119,916 A | 6/1992 | Carmen et al. | 194/210 |
| 5,155,614 A | 10/1992 | Carmen et al. | 398/202 |
| 5,158,166 A | 10/1992 | Barson | 194/319 |
| 5,184,707 A | 2/1993 | Van Horn et al. | 194/204 |
| 5,192,855 A | 3/1993 | Insulander et al. | 235/381 |
| 5,222,076 A | 6/1993 | Ng et al. | 375/9 |
| 5,244,070 A | 9/1993 | Carmen et al. | 194/319 |
| D340,038 S | 10/1993 | Venne et al. | D14/420 |
| 5,259,491 A | 11/1993 | Ward, II | 194/350 |
| 5,266,947 A | 11/1993 | Fujiwara et al. | 340/932.2 |
| 5,273,151 A | 12/1993 | Carmen et al. | 194/319 |
| 5,287,384 A | 2/1994 | Avery et al. | 375/1 |
| 5,293,979 A | 3/1994 | Levasseur | 194/317 |
| 5,343,237 A | 8/1994 | Morimoto | 348/143 |
| 5,351,798 A | 10/1994 | Hayes | 194/318 |
| 5,360,095 A | 11/1994 | Speas | 194/217 |
| 5,382,780 A | 1/1995 | Carmen | 235/384 |
| 5,402,475 A | 3/1995 | Lesner, Jr. et al. | 379/106 |
| 5,407,049 A | 4/1995 | Jacobs | 194/200 |
| D360,734 S | 7/1995 | Hall | D99/28 |
| 5,439,089 A | 8/1995 | Parker | 194/317 |
| 5,442,348 A | 8/1995 | Mushell | 340/932.2 |
| 5,454,461 A | 10/1995 | Jacobs | 194/200 |
| 5,475,373 A | 12/1995 | Speas | 340/815.58 |
| 5,489,014 A | 2/1996 | Menoud | 194/211 |
| 5,500,517 A | 3/1996 | Cagliostro | 235/486 |
| 5,526,662 A | 6/1996 | Diekhoff et al. | 70/278 |
| 5,563,491 A | 10/1996 | Tseng | 320/2 |
| 5,568,441 A | 10/1996 | Sanemitsu | 365/229 |
| D375,607 S | 11/1996 | Hall | D99/28 |
| 5,570,771 A | 11/1996 | Jacobs | 194/200 |
| 5,614,892 A | 3/1997 | Ward, II et al. | 340/870.02 |
| 5,617,942 A | 4/1997 | Ward, II et al. | 194/217 |
| 5,640,002 A | 6/1997 | Ruppert et al. | 235/472 |
| 5,642,119 A * | 6/1997 | Jacobs | G07D 3/14 194/217 |
| 5,648,906 A | 7/1997 | Amirpanahi | 705/418 |
| D381,976 S | 8/1997 | Sandor et al. | D14/420 |
| 5,659,306 A | 8/1997 | Bahar | 340/932.2 |
| 5,687,129 A | 11/1997 | Kim | 365/229 |
| D388,231 S | 12/1997 | Magee et al. | D99/28 |
| 5,710,743 A | 1/1998 | Dee et al. | 368/90 |
| D391,238 S | 2/1998 | Sakata | D14/420 |
| 5,732,812 A | 3/1998 | Grainger et al. | 194/217 |
| 5,737,710 A | 4/1998 | Anthonyson | 701/1 |
| 5,740,050 A | 4/1998 | Ward, II | 364/464.28 |
| 5,748,103 A | 5/1998 | Flach et al. | 340/870.07 |
| 5,761,061 A | 6/1998 | Amano | 364/187 |
| 5,777,951 A | 7/1998 | Mitschele et al. | 368/90 |
| 5,778,067 A | 7/1998 | Jones et al. | 380/24 |
| 5,803,228 A | 9/1998 | Lucas | 194/350 |

(56) References Cited

U.S. PATENT DOCUMENTS

| | | | |
|---|---|---|---|
| 5,805,083 A | 9/1998 | Sutton et al. | 340/932.2 |
| 5,806,651 A | 9/1998 | Carmen et al. | 194/319 |
| 5,833,042 A | 11/1998 | Baitch et al. | 194/317 |
| 5,841,369 A | 11/1998 | Sutton et al. | 340/932.2 |
| 5,842,411 A | 12/1998 | Johnson | 101/36 |
| 5,845,268 A | 12/1998 | Moore | 705/418 |
| 5,852,411 A | 12/1998 | Jacobs et al. | 340/932.2 |
| D404,025 S | 1/1999 | Van Horne et al. | D14/331 |
| 5,903,520 A | 5/1999 | Dee et al. | 368/90 |
| 5,911,763 A | 6/1999 | Quesada | 70/120 |
| D411,848 S | 7/1999 | Maruska et al. | D16/202 |
| D412,289 S | 7/1999 | Winwood | D10/42 |
| D413,311 S | 8/1999 | Blalock | D14/420 |
| 5,940,481 A | 8/1999 | Zietman | 379/114 |
| 5,954,182 A | 9/1999 | Wei | 194/345 |
| 5,966,345 A | 10/1999 | Dee et al. | 368/90 |
| 6,026,946 A | 2/2000 | McCarty, Jr. | 194/319 |
| 6,037,880 A | 3/2000 | Manion | 340/932.2 |
| 6,052,453 A | 4/2000 | Sagady et al. | 379/146 |
| 6,078,272 A | 6/2000 | Jacobs et al. | 340/932.2 |
| 6,081,205 A | 6/2000 | Williams | 340/932.2 |
| 6,081,206 A | 6/2000 | Keilland | 340/937 |
| 6,082,153 A | 7/2000 | Schoell et al. | 70/1.5 |
| 6,098,361 A | 8/2000 | Roten et al. | 52/298 |
| 6,107,942 A | 8/2000 | Yoo et al. | 340/932.2 |
| 6,109,418 A | 8/2000 | Yost | 194/350 |
| 6,111,522 A | 8/2000 | Hiltz et al. | 340/932.2 |
| 6,116,403 A | 9/2000 | Kiehl | 194/217 |
| D431,788 S | 10/2000 | Tuxen et al. | D10/42 |
| 6,147,624 A | 11/2000 | Clapper | 340/932.2 |
| 6,193,045 B1 | 2/2001 | Ishida et al. | 194/203 |
| 6,195,015 B1 | 2/2001 | Jacobs et al. | 340/693.9 |
| RE37,193 E | 5/2001 | Ward et al. | 194/217 |
| 6,229,455 B1 | 5/2001 | Yost et al. | 340/943 |
| 6,230,868 B1 | 5/2001 | Tuxen et al. | 194/217 |
| 6,243,029 B1 | 6/2001 | Tomer | 340/932.2 |
| 6,275,169 B1 | 8/2001 | Krygler et al. | 340/932.2 |
| 6,275,170 B1 | 8/2001 | Jacobs et al. | 340/932.2 |
| D448,910 S | 10/2001 | Kit et al. | D99/28 |
| 6,309,098 B1 | 10/2001 | Wong | 368/94 |
| 6,312,152 B2 | 11/2001 | Dee et al. | 368/90 |
| 6,321,201 B1 | 11/2001 | Dahl | 705/1 |
| RE37,531 E | 1/2002 | Chaco et al. | 379/38 |
| 6,340,935 B1 | 1/2002 | Hall | 340/932.2 |
| D454,421 S | 3/2002 | Jeon et al. | D99/28 |
| 6,354,425 B1 | 3/2002 | Tuxen et al. | 194/350 |
| 6,366,220 B1 | 4/2002 | Elliott | 340/928 |
| 6,373,422 B1 | 4/2002 | Mostafa | 341/155 |
| 6,373,442 B1 * | 4/2002 | Thomas | H01Q 1/22 343/700 MS |
| D461,728 S | 8/2002 | Tuxen et al. | D10/42 |
| 6,456,491 B1 | 9/2002 | Flannery et al. | 361/685 |
| 6,457,586 B2 | 10/2002 | Yasuda et al. | 209/534 |
| 6,467,602 B2 | 10/2002 | Bench et al. | 194/217 |
| 6,477,875 B2 | 11/2002 | Field et al. | 70/491 |
| D467,954 S | 12/2002 | Suzuki et al. | D16/208 |
| 6,493,676 B1 | 12/2002 | Levy | 705/13 |
| 6,505,774 B1 | 1/2003 | Fulcher et al. | |
| D472,362 S | 3/2003 | Zerman et al. | D99/28 |
| 6,575,281 B2 | 6/2003 | Lee | 192/49 |
| D481,516 S | 10/2003 | Magee et al. | D99/28 |
| D485,417 S | 1/2004 | Magee et al. | D99/28 |
| 6,697,730 B2 | 2/2004 | Dickerson | 701/200 |
| D488,280 S | 4/2004 | Zerman et al. | D99/28 |
| D492,080 S | 6/2004 | Magee et al. | D99/28 |
| D492,081 S | 6/2004 | Magee et al. | D99/28 |
| 6,747,575 B2 | 6/2004 | Chauvin et al. | 340/932.2 |
| D494,730 S | 8/2004 | Magee et al. | D99/28 |
| 6,791,473 B2 | 9/2004 | Kibria et al. | 340/932.2 |
| RE38,626 E | 10/2004 | Kielland | 340/937 |
| D497,393 S | 10/2004 | Herbst | D20/99 |
| 6,799,387 B2 | 10/2004 | Pippins | 37/456 |
| 6,823,317 B1 | 11/2004 | Ouimet et al. | 705/13 |
| 6,856,922 B1 | 2/2005 | Austin et al. | 702/63 |
| 6,874,340 B1 | 4/2005 | Berman | 7/161 |
| D505,240 S | 5/2005 | Swaine et al. | D99/28 |
| 6,889,899 B2 | 5/2005 | Silberberg | 235/384 |
| D506,769 S | 6/2005 | Asai | D16/203 |
| 6,914,411 B2 | 7/2005 | Couch et al. | 320/101 |
| D508,064 S | 8/2005 | Ramirez | D16/200 |
| 6,929,179 B2 | 8/2005 | Fulcher et al. | 235/381 |
| 7,014,355 B2 | 3/2006 | Potter, Sr. et al. | 368/90 |
| 7,019,420 B2 | 3/2006 | Kogan et al. | 307/150 |
| 7,019,670 B2 | 3/2006 | Bahar | 340/932.2 |
| 7,027,773 B1 | 4/2006 | McMillin | 455/41.2 |
| 7,028,888 B2 | 4/2006 | Laskowski | 235/379 |
| 7,029,167 B1 | 4/2006 | Mitschele | 368/90 |
| 7,040,534 B2 | 5/2006 | Turocy et al. | 235/379 |
| D524,834 S | 7/2006 | Dozier et al. | D16/200 |
| 7,071,839 B2 | 7/2006 | Patel et al. | 340/933 |
| 7,104,447 B1 | 9/2006 | Lopez et al. | 235/384 |
| 7,114,651 B2 | 10/2006 | Hjelmvik | 235/384 |
| 7,181,426 B2 | 2/2007 | Dutta | 705/37 |
| 7,183,999 B2 | 2/2007 | Matthews et al. | 345/1.1 |
| D538,505 S | 3/2007 | Kang et al. | D99/28 |
| 7,222,031 B2 | 5/2007 | Heatley | |
| 7,237,176 B2 | 6/2007 | Briggs et al. | 714/67 |
| D546,365 S | 7/2007 | Jost et al. | D16/221 |
| 7,237,716 B2 | 7/2007 | Silberberg | 235/384 |
| 7,253,747 B2 | 8/2007 | Noguchi | 340/932.2 |
| 7,284,692 B1 | 10/2007 | Douglass | 235/379 |
| 7,319,974 B1 | 1/2008 | Brusseaux | 705/13 |
| 7,330,131 B2 | 2/2008 | Zanotti et al. | 340/932.2 |
| 7,382,238 B2 | 6/2008 | Kavaler | 340/438 |
| 7,382,281 B2 | 6/2008 | Kavaler | 340/941 |
| 7,382,282 B2 | 6/2008 | Kavaler | 340/941 |
| 7,388,349 B2 | 6/2008 | Elder et al. | 320/104 |
| 7,388,517 B2 | 6/2008 | Kavaler | 340/941 |
| 7,393,134 B2 | 7/2008 | Mitschele | 368/90 |
| D575,168 S | 8/2008 | King et al. | D10/42 |
| 7,419,091 B1 | 9/2008 | Scanlon | 235/379 |
| 7,427,931 B1 | 9/2008 | Kavaler et al. | 340/941 |
| D579,795 S | 11/2008 | Martinez et al. | D10/42 |
| 7,445,144 B2 | 11/2008 | Schlabach et al. | 235/379 |
| D582,125 S | 12/2008 | Kang et al. | D99/28 |
| D587,141 S | 2/2009 | King et al. | D10/42 |
| D596,374 S | 7/2009 | Kang et al. | D99/28 |
| 7,594,235 B2 | 9/2009 | Moreau | 719/310 |
| D602,225 S | 10/2009 | Lute et al. | D99/28 |
| 7,617,120 B2 | 11/2009 | Derasmo et al. | 705/13 |
| D605,145 S | 12/2009 | Kellar | D14/125 |
| 7,624,919 B2 | 12/2009 | Meek et al. | 235/379 |
| D615,274 S | 5/2010 | Kim et al. | D99/28 |
| D617,799 S | 6/2010 | Odhe et al. | D14/420 |
| 7,739,000 B2 | 6/2010 | Kevaler | 701/1 |
| 7,748,620 B2 | 7/2010 | Gomez et al. | 235/383 |
| 7,772,720 B2 | 8/2010 | McGee et al. | 307/66 |
| 7,806,248 B2 | 10/2010 | Hunter et al. | 194/317 |
| D627,814 S | 11/2010 | Tzeng et al. | D16/202 |
| 7,825,826 B2 | 11/2010 | Welch | 340/932.2 |
| 7,854,310 B2 | 12/2010 | King et al. | 194/350 |
| 7,855,661 B2 | 12/2010 | Ponert | 340/932.2 |
| 7,874,482 B2 | 1/2011 | Mitschele | 235/384 |
| 7,933,841 B2 | 4/2011 | Schmeyer et al. | 705/64 |
| D645,223 S | 9/2011 | Bleck et al. | D99/28 |
| 8,035,533 B2 | 10/2011 | Kavaler | 340/933 |
| D652,329 S | 1/2012 | MacKay et al. | D10/42 |
| D653,014 S | 1/2012 | Rohan et al. | D99/28 |
| D653,420 S | 1/2012 | Rohan et al. | D99/28 |
| D653,421 S | 1/2012 | Rohan et al. | D99/28 |
| D654,816 S | 2/2012 | MacKay et al. | D10/42 |
| RE43,245 E | 3/2012 | Ouimet et al. | 705/13 |
| D655,263 S | 3/2012 | Tsai | D14/125 |
| D656,046 S | 3/2012 | MacKay et al. | D10/42 |
| 8,138,950 B1 | 3/2012 | Leung | 340/932.2 |
| 8,144,034 B2 | 3/2012 | Kavaler | 340/941 |
| D659,557 S | 5/2012 | Jones et al. | D10/42 |
| 8,184,019 B2 | 5/2012 | Chauvin et al. | 340/932.2 |
| D661,603 S | 6/2012 | MacKay et al. | D10/42 |
| 8,193,540 B2 | 6/2012 | Huang et al. | 257/81 |
| 8,232,894 B2 | 7/2012 | Weiss et al. | 340/932.2 |
| 8,264,401 B1 | 9/2012 | Kavaler | 342/128 |
| D672,525 S | 12/2012 | Lee et al. | D99/28 |
| D674,985 S | 1/2013 | Lee | D99/28 |

(56) References Cited

U.S. PATENT DOCUMENTS

| | | | | |
|---|---|---|---|---|
| 8,395,532 B2 | 3/2013 | Chauvin et al. | | 340/932.2 |
| 8,402,281 B2 | 3/2013 | Dahl | | 718/189 |
| D680,156 S | 4/2013 | Hernandez et al. | | D18/4.4 |
| D681,717 S | 5/2013 | Helgesson et al. | | D18/4.6 |
| 8,450,627 B2 | 5/2013 | Mittleman et al. | | 200/600 |
| D683,779 S | 6/2013 | Uemachi et al. | | D16/202 |
| D683,794 S | 6/2013 | Randall | | D20/8 |
| D683,795 S | 6/2013 | Randall | | D20/8 |
| D684,745 S | 6/2013 | Reuter et al. | | D99/28 |
| D684,870 S | 6/2013 | Jones et al. | | D10/42 |
| 8,479,909 B2 | 7/2013 | King et al. | | 194/302 |
| 8,487,754 B2 | 7/2013 | Mitschele | | 340/539.1 |
| 8,513,832 B2 | 8/2013 | Hunter et al. | | 307/66 |
| D690,771 S | 10/2013 | Randall | | D20/9 |
| 8,566,159 B2 | 10/2013 | King et al. | | 705/14.53 |
| D693,983 S | 11/2013 | Budde et al. | | D99/28 |
| 8,589,216 B2 | 11/2013 | Yu et al. | | 705/13 |
| 8,590,687 B2 | 11/2013 | King et al. | | 194/350 |
| 8,595,054 B2 | 11/2013 | King et al. | | 705/13 |
| D696,484 S | 12/2013 | Lee et al. | | D99/28 |
| D696,485 S | 12/2013 | Lee et al. | | D99/28 |
| 8,631,921 B2 | 1/2014 | Jones et al. | | 194/350 |
| 8,662,279 B2 | 3/2014 | Jones et al. | | 194/350 |
| 8,666,801 B2 | 3/2014 | Cho | | 705/13 |
| D702,913 S | 4/2014 | Budde et al. | | D99/28 |
| D702,914 S | 4/2014 | Budde et al. | | D99/28 |
| 8,684,158 B2 | 4/2014 | Jones et al. | | 194/215 |
| 8,727,207 B1 | 5/2014 | Church et al. | | 235/33 |
| D707,140 S | 6/2014 | King et al. | | D10/42 |
| D707,141 S | 6/2014 | King et al. | | D10/42 |
| D707,142 S | 6/2014 | King et al. | | D10/42 |
| 8,749,403 B2 | 6/2014 | King et al. | | 340/932.2 |
| 8,770,371 B2 | 7/2014 | MacKay et al. | | 194/350 |
| 8,807,317 B2 | 8/2014 | MacKay et al. | | 194/350 |
| D714,165 S | 9/2014 | Salama | | D10/42 |
| D716,156 S | 10/2014 | Jones et al. | | D10/42 |
| D716,515 S | 10/2014 | Cha et al. | | D99/28 |
| 8,862,494 B2 | 10/2014 | King et al. | | 705/13 |
| D716,671 S | 11/2014 | Jones et al. | | D10/42 |
| D722,740 S | 2/2015 | Budde et al. | | D99/28 |
| D724,290 S | 3/2015 | Cha et al. | | D99/28 |
| D724,811 S | 3/2015 | Reitinger | | D99/28 |
| D724,812 S | 3/2015 | Cha et al. | | D99/28 |
| D728,190 S | 4/2015 | Sheley | | D99/28 |
| 9,002,723 B2 | 4/2015 | King et al. | | 340/932.2 |
| 9,047,712 B2 | 6/2015 | King et al. | | 705/1.1 |
| D733,585 S | 7/2015 | Jones et al. | | D10/42 |
| D735,437 S | 7/2015 | Randall | | D99/28 |
| D735,438 S | 7/2015 | Randall | | D99/28 |
| D735,439 S | 7/2015 | Randall | | D99/28 |
| D735,440 S | 7/2015 | Randall | | D99/28 |
| D735,963 S | 8/2015 | Randall | | D99/28 |
| D735,964 S | 8/2015 | Randall | | D99/28 |
| D735,965 S | 8/2015 | Randall | | D99/28 |
| D739,637 S | 9/2015 | Randall | | D99/28 |
| D739,638 S | 9/2015 | Randall | | D99/28 |
| D739,639 S | 9/2015 | Randall | | D99/28 |
| 9,127,964 B2 | 9/2015 | Schwarz et al. | | 340/943 |
| D742,090 S | 10/2015 | Randall | | D99/28 |
| 9,196,097 B2 | 11/2015 | Jones et al. | | 340/870.02 |
| D746,015 S | 12/2015 | King et al. | | D99/28 |
| D748,364 S | 1/2016 | King et al. | | D99/28 |
| D748,888 S | 2/2016 | King et al. | | D99/28 |
| 2001/0012241 A1 | 8/2001 | Dee et al. | | 368/90 |
| 2001/0047278 A1 | 11/2001 | Brookner et al. | | 705/1 |
| 2001/0051531 A1 | 12/2001 | Singhal et al. | | 455/556 |
| 2002/0008639 A1 | 1/2002 | Dee | | 340/932.2 |
| 2002/0030606 A1 | 3/2002 | Chauvin et al. | | 340/932.2 |
| 2002/0062172 A1 | 5/2002 | Bench et al. | | 700/232 |
| 2002/0074344 A1 | 6/2002 | Long et al. | | 222/71 |
| 2002/0080013 A1 | 6/2002 | Anderson, III et al. | | 340/425.5 |
| 2002/0111768 A1 | 8/2002 | Ghorayeb et al. | | 702/178 |
| 2002/0134645 A1 | 9/2002 | Alexander et al. | | 194/351 |
| 2003/0017904 A1 | 1/2003 | Lee | | 475/232 |
| 2003/0092387 A1 | 5/2003 | Hjelmvik | | 455/41 |
| 2003/0112151 A1 | 6/2003 | Chauvin et al. | | 340/870.02 |
| 2003/0112597 A1 | 6/2003 | Smith | | 361/685 |
| 2003/0117904 A1 | 6/2003 | Lank et al. | | |
| 2003/0121754 A1 | 7/2003 | King | | 194/302 |
| 2003/0128010 A1 | 7/2003 | Hsu | | 320/101 |
| 2003/0128136 A1 | 7/2003 | Spier et al. | | 340/932.2 |
| 2003/0132840 A1 | 7/2003 | Bahar | | 340/541 |
| 2003/0140531 A1 | 7/2003 | Pippins | | 37/456 |
| 2003/0144905 A1 | 7/2003 | Smith | | 705/14 |
| 2003/0144972 A1 | 7/2003 | Cordery et al. | | 705/401 |
| 2003/0169183 A1 | 9/2003 | Korepanov et al. | | 340/932.2 |
| 2003/0179107 A1 | 9/2003 | Kibria et al. | | 340/932.2 |
| 2003/0220835 A1 | 11/2003 | Barnes, Jr. | | 705/14 |
| 2003/0222792 A1 | 12/2003 | Berman et al. | | 340/932.2 |
| 2003/0234888 A1 | 12/2003 | Hong et al. | | 348/375 |
| 2004/0011099 A1 | 1/2004 | Andersson | | 70/371 |
| 2004/0016796 A1 | 1/2004 | Hanna et al. | | 235/375 |
| 2004/0039632 A1 | 2/2004 | Han et al. | | 705/13 |
| 2004/0040028 A1 | 2/2004 | Moreau | | 719/310 |
| 2004/0068434 A1 | 4/2004 | Kanekon | | |
| 2004/0084278 A1 | 5/2004 | Harris et al. | | 194/302 |
| 2004/0094619 A1 | 5/2004 | Silberberg | | 235/382 |
| 2004/0160905 A1 | 8/2004 | Bernier et al. | | 370/310 |
| 2004/0181496 A1 | 9/2004 | Odinotski et al. | | 705/418 |
| 2004/0232878 A1 | 11/2004 | Couch et al. | | 320/101 |
| 2004/0243526 A1 | 12/2004 | Krygler et al. | | 705/418 |
| 2004/0262379 A1 | 12/2004 | Gomes | | 235/379 |
| 2004/0263117 A1 | 12/2004 | Kogan et al. | | 320/114 |
| 2004/0264302 A1 | 12/2004 | Ward, II | | 368/90 |
| 2005/0035740 A1 | 2/2005 | Elder et al. | | 320/116 |
| 2005/0040951 A1 | 2/2005 | Zalewski et al. | | 340/572.1 |
| 2005/0068201 A1 | 3/2005 | Wulff et al. | | 341/20 |
| 2005/0155839 A1 | 7/2005 | Banks et al. | | 194/302 |
| 2005/0168352 A1 | 8/2005 | Tomer | | 340/932.2 |
| 2005/0178639 A1 | 8/2005 | Brumfield et al. | | 194/350 |
| 2005/0192911 A1 | 9/2005 | Mattern | | 705/401 |
| 2006/0020487 A1 | 1/2006 | Spittel et al. | | 705/1 |
| 2006/0021848 A1 | 2/2006 | Smith | | 194/350 |
| 2006/0114159 A1 | 6/2006 | Yoshikawa et al. | | |
| 2006/0116972 A1 | 6/2006 | Wong | | 705/418 |
| 2006/0136131 A1 | 6/2006 | Dugan et al. | | 701/300 |
| 2006/0149684 A1 | 7/2006 | Matsuura et al. | | 705/65 |
| 2006/0152349 A1 | 7/2006 | Ratnakar | | 340/426.1 |
| 2006/0152385 A1 | 7/2006 | Mandy | | 340/932.2 |
| 2006/0173733 A1 | 8/2006 | Fancher | | 705/13 |
| 2006/0255119 A1 | 11/2006 | Marchasin et al. | | 235/375 |
| 2006/0259354 A1 | 11/2006 | Yan | | 705/13 |
| 2006/0267799 A1 | 11/2006 | Mendelson | | 340/932.2 |
| 2007/0011700 A1 | 1/2007 | Johnson | | 725/34 |
| 2007/0016539 A1 | 1/2007 | Groft et al. | | 705/418 |
| 2007/0017265 A1 | 1/2007 | Andersson | | 70/379 |
| 2007/0029825 A1 | 2/2007 | Franklin et al. | | 293/128 |
| 2007/0044523 A1 | 3/2007 | Davis | | 70/34 |
| 2007/0061155 A1 | 3/2007 | Ji et al. | | 705/1 |
| 2007/0094153 A1 | 4/2007 | Ferraro | | 705/67 |
| 2007/0114849 A1 | 5/2007 | Falik et al. | | 307/64 |
| 2007/0119682 A1 | 5/2007 | Banks et al. | | 705/418 |
| 2007/0129974 A1 | 6/2007 | Chen et al. | | 705/5 |
| 2007/0136128 A1 | 6/2007 | Janacek et al. | | 705/13 |
| 2007/0171069 A1 | 7/2007 | Allen | | 340/572.1 |
| 2007/0184852 A1 | 8/2007 | Johnson et al. | | 455/456.1 |
| 2007/0208499 A1 | 9/2007 | Kwong | | 701/117 |
| 2007/0210935 A1 | 9/2007 | Yost et al. | | 340/932.2 |
| 2007/0276724 A1 | 11/2007 | Catt | | 705/13 |
| 2007/0285281 A1 | 12/2007 | Welch | | 340/932.2 |
| 2008/0071611 A1 | 3/2008 | Lovett | | 705/13 |
| 2008/0093454 A1 | 4/2008 | Yamazaki et al. | | |
| 2008/0147268 A1 | 6/2008 | Fuller | | 701/35 |
| 2008/0158010 A1 | 7/2008 | Nath et al. | | 340/932.2 |
| 2008/0165030 A1 | 7/2008 | Kuo et al. | | 340/932.2 |
| 2008/0208680 A1 | 8/2008 | Cho | | 705/13 |
| 2008/0218383 A1 | 9/2008 | Franklin et al. | | 340/937 |
| 2008/0238715 A1 | 10/2008 | Cheng et al. | | 340/870.03 |
| 2008/0245638 A1 | 10/2008 | King et al. | | 194/350 |
| 2008/0265019 A1 | 10/2008 | Artino et al. | | 235/379 |
| 2008/0266138 A1 | 10/2008 | Ponert | | 340/932.2 |
| 2008/0270227 A1 | 10/2008 | Amri | | 705/13 |
| 2008/0277468 A1 | 11/2008 | Mitschele | | 235/384 |
| 2008/0289030 A1* | 11/2008 | Poplett | | G06F 21/31 |

(56) References Cited

U.S. PATENT DOCUMENTS

| | | | |
|---|---|---|---|
| 2008/0291054 A1 | 11/2008 | Groft | 340/932.2 |
| 2008/0319837 A1 | 12/2008 | Mitschele | 705/13 |
| 2009/0026842 A1 | 1/2009 | Hunter et al. | 307/66 |
| 2009/0032368 A1 | 2/2009 | Hunter et al. | 194/318 |
| 2009/0049875 A1 | 2/2009 | Buhl et al. | 70/52 |
| 2009/0057398 A1 | 3/2009 | Douglass et al. | 235/379 |
| 2009/0083149 A1 | 3/2009 | Maekawa et al. | 705/14 |
| 2009/0095593 A1 | 4/2009 | King et al. | 194/302 |
| 2009/0099761 A1 | 4/2009 | Davis et al. | 701/120 |
| 2009/0102726 A1 | 4/2009 | Imano et al. | |
| 2009/0109062 A1 | 4/2009 | An | 340/932.2 |
| 2009/0137204 A1 | 5/2009 | Chang | 455/41.1 |
| 2009/0159674 A1 | 6/2009 | King et al. | 235/382 |
| 2009/0183966 A1 | 7/2009 | King et al. | 194/217 |
| 2009/0192950 A1* | 7/2009 | King | G06Q 30/0284 726/15 705/418 |
| 2009/0199966 A1 | 8/2009 | Coleman et al. | |
| 2009/0254438 A1 | 10/2009 | Johnson, Jr. et al. | 705/17 |
| 2009/0267732 A1 | 10/2009 | Chauvin et al. | 340/5.53 |
| 2009/0284907 A1 | 11/2009 | Regimbal et al. | 361/679.02 |
| 2009/0287578 A1 | 11/2009 | Paluszek et al. | 705/17 |
| 2009/0315720 A1 | 12/2009 | Clement et al. | 340/573.5 |
| 2010/0019936 A1 | 1/2010 | Kaveler | 340/933 |
| 2010/0025459 A1 | 2/2010 | Yamada | 235/375 |
| 2010/0026522 A1 | 2/2010 | Ward, II | 340/932.2 |
| 2010/0030629 A1 | 2/2010 | Ward, II | 705/13 |
| 2010/0106517 A1 | 4/2010 | Kociubinski et al. | 705/2 |
| 2010/0153193 A1 | 6/2010 | Ashby et al. | 705/13 |
| 2010/0187300 A1 | 7/2010 | Ramachandran et al. | 235/379 |
| 2010/0188932 A1 | 7/2010 | Hanks et al. | 367/140 |
| 2010/0241564 A1 | 9/2010 | Miller et al. | 705/43 |
| 2010/0328104 A1 | 12/2010 | Groft | 340/932.2 |
| 2011/0022427 A1 | 1/2011 | Dayan | 705/5 |
| 2011/0037562 A1* | 2/2011 | Braukmann | G06F 3/0414 340/5.9 |
| 2011/0057815 A1 | 3/2011 | King et al. | 340/932.2 |
| 2011/0060653 A1 | 3/2011 | King et al. | 705/14.58 |
| 2011/0066297 A1 | 3/2011 | Saberi et al. | 700/287 |
| 2011/0093314 A1* | 4/2011 | Redmann | G06Q 20/127 705/13 |
| 2011/0122036 A1* | 5/2011 | Leung | H01Q 9/0485 343/785 |
| 2011/0158331 A1 | 6/2011 | Kavaler et al. | 375/259 |
| 2011/0203901 A1 | 8/2011 | King et al. | 194/211 |
| 2011/0205087 A1 | 8/2011 | Kell et al. | 340/932.2 |
| 2011/0221624 A1 | 9/2011 | Kavaler | 342/22 |
| 2011/0261548 A1 | 10/2011 | Gandhi | |
| 2011/0276519 A1 | 11/2011 | MacKay et al. | 705/418 |
| 2011/0313822 A1 | 12/2011 | Burdick | 705/13 |
| 2011/0320243 A1 | 12/2011 | Khan | 705/13 |
| 2012/0026015 A1 | 2/2012 | Kavaler | 340/933 |
| 2012/0173171 A1 | 7/2012 | Bajwa et al. | 702/56 |
| 2012/0208521 A1 | 8/2012 | Hager et al. | 455/422.1 |
| 2012/0222935 A1 | 9/2012 | MacKay et al. | 194/210 |
| 2012/0273322 A1 | 11/2012 | MacKay et al. | 194/210 |
| 2012/0285790 A1 | 11/2012 | Jones et al. | 194/217 |
| 2012/0285791 A1 | 11/2012 | Jones et al. | 194/217 |
| 2012/0285792 A1 | 11/2012 | Jones et al. | 194/217 |
| 2012/0285793 A1 | 11/2012 | Jones et al. | 194/217 |
| 2012/0286036 A1 | 11/2012 | Jones et al. | 235/380 |
| 2012/0286968 A1 | 11/2012 | Jones et al. | 340/870.02 |
| 2012/0292385 A1 | 11/2012 | MacKay et al. | 235/375 |
| 2013/0005445 A1 | 1/2013 | Walker et al. | 463/25 |
| 2013/0027218 A1 | 1/2013 | Schwarz et al. | 340/870.02 |
| 2013/0085928 A1 | 4/2013 | McKinney | 705/39 |
| 2013/0124270 A1 | 5/2013 | Tziperman et al. | 705/13 |
| 2013/0238406 A1 | 9/2013 | King et al. | 705/13 |
| 2013/0285455 A1 | 10/2013 | Hunter et al. | 307/66 |
| 2014/0040028 A1 | 2/2014 | King et al. | 705/14.53 |
| 2014/0058805 A1 | 2/2014 | Paesler et al. | 705/13 |
| 2014/0108107 A1 | 4/2014 | Jones et al. | 705/13 |
| 2014/0172518 A1 | 6/2014 | King et al. | 705/13 |
| 2014/0174881 A1 | 6/2014 | King et al. | 194/350 |
| 2014/0213176 A1 | 7/2014 | Mendelson | 455/39 |
| 2014/0214499 A1 | 7/2014 | Hudson et al. | 705/13 |
| 2014/0231505 A1 | 8/2014 | King et al. | 235/375 |
| 2014/0279565 A1 | 9/2014 | Trump et al. | 705/72 |
| 2014/0289025 A1 | 9/2014 | King et al. | 705/13 |
| 2014/0319211 A1 | 10/2014 | MacKay et al. | 235/380 |
| 2015/0084786 A1 | 3/2015 | King et al. | 340/870.02 |
| 2015/0106170 A1 | 4/2015 | Salama | G07F 17/246 |
| 2015/0235503 A1 | 8/2015 | King et al. | G07F 17/248 |
| 2015/0332587 A1 | 11/2015 | Schwarz et al. | G08G 1/017 |

FOREIGN PATENT DOCUMENTS

| | | | |
|---|---|---|---|
| CA | 2260925 | 1/1998 | G07B 15/00 |
| CA | 2227833 | 7/1998 | G07F 17/24 |
| CA | 2346908 | 4/2000 | G07C 1/30 |
| CA | 2352968 | 1/2001 | G07F 17/24 |
| CA | 2377010 | 12/2001 | G06F 19/00 |
| CA | 2357179 | 3/2002 | G08C 17/00 |
| CA | 2437722 | 8/2002 | G08G 1/14 |
| CA | 2363915 | 5/2003 | G07F 17/24 |
| CA | 2413198 | 5/2003 | G07F 17/24 |
| CA | 2414132 | 6/2003 | G07F 17/24 |
| CA | 2248347 | 10/2005 | G07C 1/30 |
| CA | 2511461 | 2/2007 | G07C 1/30 |
| CA | 2631699 | 6/2007 | G06Q 10/00 |
| CA | 2622164 | 8/2008 | G07F 17/24 |
| CA | 2693911 | 1/2009 | G06Q 50/00 |
| CA | 2650192 | 7/2009 | G08C 17/02 |
| CA | 2650195 | 7/2009 | G01D 4/02 |
| CA | 134041 | 9/2010 | |
| CA | 134042 | 9/2010 | |
| CA | 2773132 | 3/2011 | G06Q 30/00 |
| CA | 2773135 | 3/2011 | G06Q 20/00 |
| CA | 2770093 | 5/2012 | G07C 1/30 |
| CA | 2870592 | 5/2012 | G07F 17/24 |
| CA | 2874155 | 5/2012 | G07F 17/24 |
| CA | 155382 | 5/2015 | |
| CA | 155383 | 5/2015 | |
| CA | 155391 | 5/2015 | |
| CA | 156990 | 5/2015 | |
| CA | 156991 | 5/2015 | |
| CA | 156992 | 5/2015 | |
| CA | 156993 | 5/2015 | |
| CA | 156994 | 5/2015 | |
| CA | 156995 | 5/2015 | |
| CA | 157067 | 5/2015 | |
| CA | 157068 | 5/2015 | |
| CA | 157069 | 5/2015 | |
| CA | 161049 | 10/2015 | |
| CN | 2395344 | 9/2000 | G07F 17/24 |
| CN | 2544352 | 4/2003 | G06F 19/00 |
| DE | 28 04 085 A1 | 2/1977 | |
| DE | 27 50 193 C2 | 11/1977 | |
| DE | 102005041290 | 3/2007 | G07B 15/02 |
| EP | 0329129 | 8/1989 | G07F 17/24 |
| EP | 980055 | 9/2001 | G07F 17/24 |
| EP | 1327962 | 7/2003 | G07B 15/02 |
| EP | 1376491 | 1/2004 | G07F 7/00 |
| EP | 1748393 | 1/2007 | G07C 1/30 |
| EP | 1898360 | 3/2008 | G07B 15/02 |
| EP | 2215605 | 8/2012 | G07B 15/02 |
| FR | 2837583 | 9/2003 | G06K 19/077 |
| GB | 1 237 579 | 12/1968 | |
| GB | 1 283 555 | 10/1969 | |
| GB | 1431862 | 4/1976 | G08B 25/00 |
| GB | 2155228 | 9/1985 | G09F 23/00 |
| GB | 2298510 | 9/1996 | G07F 7/10 |
| JP | S6437661 | 2/1989 | E04H 6/00 |
| JP | 01165494 | 6/1989 | B42D 15/10 |
| JP | 01303026 | 12/1989 | G11C 5/00 |
| JP | 0261711 | 3/1990 | G06F 1/26 |
| JP | 0487513 | 3/1992 | H02J 9/00 |
| JP | H08305998 | 11/1996 | E04H 6/00 |
| JP | 2002074430 | 3/2002 | G06Q 50/00 |
| JP | 2002099640 | 4/2002 | G06Q 10/00 |
| JP | 2002528799 | 9/2002 | G06Q 50/00 |
| JP | 2005242888 | 9/2005 | G06Q 10/00 |
| JP | 2005267430 | 9/2005 | G06Q 10/00 |
| JP | 2007052773 | 3/2007 | G07F 17/24 |

(56) References Cited

FOREIGN PATENT DOCUMENTS

| | | | | |
|---|---|---|---|---|
| JP | 2011060206 | 3/2011 | ............ | G07B 15/00 |
| KR | 20000016671 | 3/2000 | ............ | G07F 17/24 |
| KR | 20010028481 | 4/2001 | ............ | G07B 1/00 |
| KR | 20050038077 | 4/2005 | ............ | G07B 5/12 |
| KR | 1020080026282 | 3/2008 | ............ | G06F 19/00 |
| MX | 2008007047 | 8/2008 | ............ | G06Q 10/00 |
| WO | WO 81/00778 | 3/1981 | | |
| WO | WO9520204 | 7/1995 | ............ | G07F 17/24 |
| WO | WO9611453 | 4/1996 | ............ | G07C 1/30 |
| WO | WO97/12345 | 4/1997 | ............ | G07F 17/24 |
| WO | WO9737328 | 10/1997 | ............ | G07B 15/02 |
| WO | WO98/04080 | 1/1998 | ............ | H04M 15/00 |
| WO | WO0059201 | 10/2000 | ............ | H04M 15/00 |
| WO | WO01/69541 | 9/2001 | ............ | G07F 17/24 |
| WO | WO0180157 | 10/2001 | ............ | G06F 19/00 |
| WO | WO02063570 | 8/2002 | | |
| WO | WO2004012352 | 2/2004 | ............ | H04B 1/38 |
| WO | WO2005031494 | 4/2005 | | |
| WO | WO2006095352 | 9/2006 | ............ | H02J 9/06 |
| WO | WO2007063530 | 6/2007 | ............ | G06Q 10/00 |
| WO | WO2009009854 | 1/2009 | ............ | G06Q 50/00 |
| WO | WO2009154787 | 12/2009 | ............ | G08G 1/14 |
| WO | WO2010008610 | 1/2010 | ............ | G08G 1/065 |
| WO | WO2010071974 | 7/2010 | ............ | G07C 1/30 |
| WO | WO2011029061 | 3/2011 | ............ | G06Q 30/00 |
| WO | WO2011029062 | 3/2011 | ............ | G06Q 20/00 |
| WO | WO2012015453 | 2/2012 | ............ | G08G 1/042 |
| WO | WO2012092609 | 7/2012 | ............ | G08G 1/01 |
| WO | WO2012154902 | 11/2012 | ............ | G07F 17/14 |
| WO | WO2012154913 | 11/2012 | ............ | G06Q 50/30 |
| WO | WO2013016453 | 1/2013 | ............ | G07B 15/02 |
| WO | WO2013049418 | 4/2013 | | |
| WO | WO2014014494 | 1/2014 | ............ | G07B 15/02 |

OTHER PUBLICATIONS

International Search Report, PCT/US2010/047906, dated Mar. 30, 2011 (3 pgs).
International Search Report, PCT/IB06/054574, dated Oct. 27, 2008 (2 pgs).
Office Action, dated Dec. 13, 2011 in U.S. Appl. No. 12/973,109 (27 pgs).
Office Action, dated Sep. 14, 2011 in U.S. Appl. No. 12/430,733 (7 pgs).
Office Action, dated Dec. 7, 2011 in U.S. Appl. No. 12/355,734 (31 pgs).
Office Action, dated Sep. 15, 2011 in U.S. Appl. No. 12/355,740 (6 pgs).
Office Action, dated Dec. 20, 2011 in U.S. Appl. No. 12/355,740 (12 pgs).
Office Action, dated Jun. 29, 2011 in U.S. Appl. No. 12/059,909 (21 pgs).
Office Action, dated Jul. 27, 2011 in U.S. Appl. No. 12/059,909 (34 pgs).
Office Action, dated Apr. 11, 2011 in U.S. Appl. No. 12/095,914 (3 pgs).
Request for Continued Examination, dated Sep. 27, 2011 in U.S. Appl. No. 12/059,909 (18 pgs).
Request for Continued Examination, dated Mar. 30, 2012 in U.S. Appl. No. 12/355,734 (32 pgs).
Meter Solutions, Single-Space Meters brochure, downloaded from www.duncansolutions.com website, revised Apr. 2006 (2 pgs).
Anonymous, "The Originators of Metered Parking, Series II, APM-E Mechanism, Service Manual," POM Incorporated, May 23, 2006 revision (22 pgs).
Byrd, Dennis, "City officials plug solar-powered parking meters, Electronic eye ends free parking," Lawrence Journal World, Apr. 30, 1989, p. 11C (1pg).
Byrd, Dennis, Parking Meter Manufacturer Sees Bright Future for New Sun-Powered Devices, Los Angeles Times, May 14, 1989 (2 pgs).

International Preliminary Report on Patentability, issued for application No. PCT/US2010/047907, dated Mar. 15, 2012 (6 pgs).
International Preliminary Report on Patentability, issued for application No. PCT/US2010/047906, dated Mar. 6, 2012 (5 pgs).
International Preliminary Report on Patentability, issued for application No. PCT/IB2006/054574, dated Mar. 10, 2009 (5 pgs).
Office Action issued for U.S. Appl. No. 12/973,109, dated Apr. 30, 2012 (24 pgs).
Office Action issued for U.S. Appl. No. 12/355,734, dated Apr. 6, 2012 (36 pgs).
Information Disclosure Statement by Applicant filed for U.S. Appl. No. 12/355,734 on May 23, 2012 (22 pgs).
Information Disclosure Statement by Applicant filed for U.S. Appl. No. 12/355,740 on May 23, 2012 (25 pgs).
Information Disclosure Statement by Applicant filed for U.S. Appl. No. 12/875,959 on May 24, 2012 (22 pgs).
Information Disclosure Statement by Applicant filed for U.S. Appl. No. 12/875,975 on May 24, 2012 (22 pgs).
Request for Continued Examination (RCE) and Information Disclosure Statement by Applicant filed for U.S. Appl. No. 12/973,109 on May 31, 2012 (43 pgs).
International Search Report, PCT/CA2009/001058, dated Nov. 12, 2009.
International Search Report, PCT/CA2009/001657, dated Feb. 17, 2010.
(Cell Net Data Systems) "First Wireless Monitoring of Parking Meters Results in Theft Arrests Using CellNet Data Systems Technology," PRNewswire, May 11, 1999 (2 pgs).
Information Disclosure Statement by Applicant filed Oct. 23, 2012 for U.S. Appl. No. 12/355,734 (2 pgs).
Office Action issued for related U.S. Appl. No. 13/546,918, dated Sep. 26, 2012 (26 pgs).
Canadian Office Action issued for related U.S. Appl. No. 2,770,093, dated Jul. 5, 2012 (5 pgs).
International Search Report & Written Opinion, PCT/CA12/000191, dated Jun. 20, 2012 (8 pgs).
Office Action issued for related U.S. Appl. No. 13/410,831, dated Nov. 6, 2012 (46 pgs).
Office Action issued in related U.S. Appl. No. 08/959,109, dated Nov. 21, 2012 (24 pgs).
Office Action issued in related U.S. Appl. No. 13/545,871, dated Nov. 28, 2012 (30 pgs).
Office Action issued in related U.S. Appl. No. 12/973,109, dated Jan. 28, 2013 (19 pgs).
Office Action issued in related U.S. Appl. No. 13/545,871, dated Dec. 28, 2012 (7 pgs).
Office Action issued in related U.S. Appl. No. 13/410,831, dated Feb. 12, 2013 (20 pgs).
Office Action issued in related U.S. Appl. No. 13/410,831, dated Jul. 12, 2013 (7 pgs).
Flatley, J., "In San Francisco, hackers park for free," posted Jul. 31, 2009, www.engadget.com (1 pg).
Howland, S., "How M2M Maximizes Denver's Revenue," FieldTechnologiesOnline.com, Oct. 2011, pp. 9-12 (4 pgs).
The United States Conference of Mayors Press Release, "The U.S. Conference of Mayors Presents 'Best-Practice' Awards," Jan. 20, 2012, (3 pgs).
Canadian Office Action issued for related application No. 2,745,365, dated Jul. 4, 2012 (2 pgs).
Canadian Office Action issued for related application No. 2,745,365, dated Jun. 5, 2012 (2 pgs).
Canadian Office Action issued for related application No. 2,745,365, dated Aug. 26, 2011 (4 pgs).
Canadian Office Action issued for related application No. 2,745,365, dated Mar. 1, 2012 (6 pgs).
Duncan Solutions "Single-Space Meters" brochure, undated (2 pgs).
International Search Report issued for PCT/US2012/048190, dated Jan. 22, 2013 (4 pgs).
McCullagh, D., "Hackers: We can bypass San Francisco c-parking meters," Jul. 30, 2009, http://news.cnet.com (2 pgs).
Office Action issued in related U.S. Appl. No. 13/545,871, dated Apr. 12, 2013 (16 pgs).

(56) References Cited

OTHER PUBLICATIONS

Office Action issued in related U.S. Appl. No. 13/546,918, dated Apr. 15, 2013 (21 pgs).
Office Action issued in related U.S. Appl. No. 08/959,109, dated Apr. 23, 2013 (10 pgs).
Office Action issued in related U.S. Appl. No. 13/141,977, dated May 8, 2013 (34 pgs).
Office Action issued in related U.S. Appl. No. 13/410,831, dated May 28, 2013 (15 pgs).
Notice of Allowance issued in U.S. Appl. No. 13/545,871, dated May 28, 2013 (10 pgs).
Office Action issued in related U.S. Appl. No. 13/141,983, dated Jun. 14, 2013 (68 pgs).
Office Action issued in related U.S. Appl. No. 13/529,914, dated Jun. 21, 2013 (33 pgs).
Micrel, Application Note 51 Frequency Hopping Techniques, Jun. 2006, Rev. 1.0.
Office Action issued in related U.S. Appl. No. 13/141,977, dated Aug. 1, 2013 (37 pgs).
Office Action issued in related U.S. Appl. No. 13/545,871, dated Aug. 6, 2013 (39 pgs).
International Preliminary Report on Patentability issued in related application No. PCT/CA2012/000191, dated Sep. 12, 2013 (7 pgs).
Office Action issued in related U.S. Appl. No. 13/529,914, dated Sep. 27, 2013 (18 pgs).
Notice of Allowance issued in related U.S. Appl. No. 13/410,831, dated Oct. 11, 2013 (33 pgs).
Office Action issued in related U.S. Appl. No. 13/141,983, dated Oct. 22, 2013 (47 pgs).
DAT Self-Service System Limited, Product Brochure, Version 1.0, Date: May 2005, pp. 1-39 (39 pgs), plus English translation (42 pgs).
Notice of Allowance issued in related U.S. Appl. No. 13/545,871, dated Dec. 16, 2013 (22 pgs).
Office Action issued in related U.S. Appl. No. 08/418,018, dated Jul. 25, 1997 (6 pgs).
Office Action issued in related U.S. Appl. No. 08/418,018, dated Jan. 17, 1997 (11 pgs).
Office Action issued in related U.S. Appl. No. 08/959,109, dated May 25, 2012 (4 pgs).
Office Action issued in related U.S. Appl. No. 08/959,109, dated Aug. 5, 2011 (7 pgs).
Office Action issued in related U.S. Appl. No. 08/959,109, dated Apr. 1, 2011 (8 pgs).
Office Action issued in related U.S. Appl. No. 08/959,109, dated Jan. 26, 1998 (9 pgs).
Office Action issued in related U.S. Appl. No. 13/141,977, dated Oct. 11, 2012 (35 pgs).
Notice of Allowance issued in related U.S. Appl. No. 29/433,549, dated Feb. 27, 2014 (60 pgs).
Remedios et al., "NFC Technologies in Mobile Phones and Emerging Applications," 2006, IFIP International Federation for Information Processing, vol. 220, Information Technology for Balanced Manufacturing Systems, ed. Shen, W., (Boston: Springer, pp. 425-434 (10 pgs).
Burden et al., "Near Field Communications (NFC) in Public Transport," Digital Identity Forum, 2006 (18 pgs).
Office Action issued in related U.S. Appl. No. 14/094,382, dated Aug. 5, 2014 (47 pgs).
Office Action issued in related U.S. Appl. No. 14/094,382, dated Dec. 26, 2014 (25 pgs).
Fidelman, C., "Time's running out for parking meters at present locations: $270,000 cited as replacement cost. City employees who ticket motorists find electronic meters unsuitable," The Gazette, Final Edition, Montreal, Quebec, Canada, Nov. 12, 2002, p. A7 (2 pgs).
International Search Report in related application No. PCT/CA2007/001266, dated Apr. 21, 2008 (3 pgs).
Supplementary European Search Report issued in related application No. EP07784953, dated Jul. 1, 2010 (1 pg).
Notice of Allowance issued in related U.S. Appl. No. 29/489,572 dated Jun. 11, 2014 (10 pgs).

Basu et al., "Networked Parking Spaces: Architecture and Applications," MCL Technical Report No. 07-01-2002, Proc. IEEE Vehicular Transportation Conference, Vancouver, Canada, Sep. 2002 (10 pgs).
Bayless et al., "Smart Parking and the Connected Consumer," ITS America Research, Dec. 2012 (39 pgs).
Bernspång, F., "Smart Parking using Magnetometers and Mobile Applications," Master's Thesis, Master of Science in Engineering Technology, Computer Science and Engineering, Luleå University of Technology, Nov. 2010-May 2011 (35 pgs).
Canadian Office Action issued in application No. 2,745,368, dated Aug. 4, 2011 (2 pgs).
Canadian Office Action issued in application No. 2,745,368, dated Nov. 1, 2011 (3 pgs).
Canadian Office Action issued in application No. 2,770,093, dated Apr. 10, 2013 (2 pgs).
Canadian Office Action issued in application No. 2,770,093, dated Jun. 11, 2014 (2 pgs).
Canadian Office Action issued in application No. 2,770,093, dated Oct. 15, 2014 (3 pgs).
Canadian Office Action issued in application No. 2,770,093, dated Oct. 29, 2012 (2 pgs).
Canadian Office Action issued in application No. 2,773,250, dated Mar. 26, 2015 (10 pgs).
Canadian Office Action issued in application No. 2,773,250, dated Jun. 20, 2013 (3 pgs).
Canadian Office Action issued in application No. 2,773,250, dated Jun. 30, 2014 (3 pgs).
Canadian Office Action issued in application No. 2,773,250, dated Mar. 12, 2014 (5 pgs).
Canadian Office Action issued in application No. 2,773,250, dated Nov. 12, 2014 (10 pgs).
Canadian Office Action issued in application No. 2,773,250, dated Oct. 7, 2013 (4 pgs).
Canadian Office Action issued in application No. 2,870,544, dated Jan. 19, 2015 (5 pgs).
Cosgrove, D., "SmartPark," Senior Project Report, Jun. 12, 2013 (20 pgs).
Office Action issued in U.S. Appl. No. 14/094,382, dated Mar. 24, 2015 (16 pgs).
Office Action issued in U.S. Appl. No. 14/325,134, dated Apr. 1, 2015 (46 pgs).
POM APM photographs (33 pgs).
POM APM Solar Powered Meter advertisements, undated (5 pgs).
Shaheen, S., "Smart Parking Management Field Test: A Bay Area Rapid Transit (BART) District Parking Demonstration," Institute of Transportation Studies, UC Davis, Jan. 1, 2005 (139 pgs).
StreetSmart Technology, LLC, "Technical Specifications and System Features for the StreetSmart Solution" Brochure (8 pgs).
Office Action issued in related U.S. Appl. No. 13/141,977, dated May 28, 2015 (88 pgs).
Bridge IR Group, Inc., Changing the Way the World Pays for On-Street Parking, Research Report, United States-Technology Processing Systems/Products, Dec. 6, 2006 (23 pgs).
Canadian Office Action issued in application No. 2,870,544, dated Oct. 15, 2015 (6 pgs).
IPS Multi Bay Parking Meter product description, http://www.design-industry.com.au/work/mulit-bay-parking-meter/, Oct. 6, 2015 (6 pgs).
IPS Single Bay Parking Meter product description, http://www.design-industry.com.au/work/ips-single-parking-meter/, Oct. 6, 2015 (6 pgs).
Office Action issued in U.S. Appl. No. 14/325,134, dated Jul. 21, 2015 (28 pgs).
Photo Violation Technologies—Revolutionizing the Industry by Perfecting How People Park, https://web.archive.org/web/20060813094459/http://photoviolation.com/, Aug. 13, 2006 (65 pgs).
Photo Violation Technologies—Revolutionizing the Industry by Perfecting How People Park, https://web.archive.org/web/20060823100739/http://photoviolation.com/, Aug. 23, 2006 (65 pgs).

(56) References Cited

OTHER PUBLICATIONS

Photo Violation Technologies—Revolutionizing the Industry by Perfecting How People Park, https://web.archive.org/web/20080222104246/http://photoviolation.com/, Feb. 22, 2008 (47 pgs).
Photo Violation Technologies—Revolutionizing the Industry by Perfecting How People Park, https://web.archive.org/web/20060110041849/http://photoviolation.com/, Jan. 10, 2006 (57 pgs).
Photo Violation Technologies—Revolutionizing the Industry by Perfecting How People Park, https://web.archive.org/web/20060715195511/http://photoviolation.com/, Jul. 15, 2006 (49pgs).
Photo Violation Technologies Corp. Press Releases, Jul. 18, 2005-Jan. 17, 2006 (9 pgs).
Photo Violation Technologies Corp., https://web.archive.org/web/20131118213440/http://photoviolationmeter.com/, Nov. 18, 2013 (8 pgs).
Photo Violation Technologies Corp., https://web.archive.org/web/20040401225217/http://photoviolationmeter.com/, Apr. 1, 2004 (50 pgs).
PhotoViolationMeter pamphlet (undated) 2 pgs).
The Patented PhotoViolationMeter Solution book view (undated) (12 pgs).
The PhotoViolationMeter Case Study, Photo Violation Technologies Corp., Dec. 15, 2015 (4 pgs).
YouTube video, "The PhotoViolationMeter TM" https://www.youtube.com/watch?v=YEFuebnwn_Y, Dec. 15, 2006 (2 pgs).
U.S. Appl. No. 08/959,109, filed Oct. 23, 1997.
U.S. Appl. No. 10/317,414, filed Dec. 12, 2002.
U.S. Appl. No. 12/430,733, filed Apr. 27, 2009.
U.S. Appl. No. 12/788,100, filed May 26, 2010.
U.S. Appl. No. 13/141,977, filed Jun. 23, 2011.
U.S. Appl. No. 13/141,983, filed Jun. 23, 2011.
U.S. Appl. No. 13/410,831, filed Mar. 2, 2012.
U.S. Appl. No. 13/454,976, filed Apr. 24, 2012.
U.S. Appl. No. 13/529,914, filed Jun. 21, 2012.
U.S. Appl. No. 13/545,871, filed Jul. 10, 2012.
U.S. Appl. No. 29/367,429, filed Aug. 6, 2010.
U.S. Appl. No. 29/367,431, filed Aug. 6, 2010.
U.S. Appl. No. 29/391,605, filed May 11, 2011.
U.S. Appl. No. 29/410,857, filed Jan. 12, 2012.
U.S. Appl. No. 29/433,549, filed Oct. 1, 2012.
U.S. Appl. No. 61/048,133, filed Apr. 25, 2008.
U.S. Appl. No. 61/140,543, filed Dec. 23, 2008.
U.S. Appl. No. 13/782,818, filed Mar. 1, 2013.
U.S. Appl. No. 14/094,382, filed Dec. 2, 2013.
U.S. Appl. No. 29/489,572, filed Apr. 30, 2014.
U.S. Appl. No. 14/325,134, filed Jul. 7, 2014.
U.S. Appl. No. 14/743,691, filed Jun. 18, 2015.
U.S. Appl. No. 14/864,170, filed Sep. 24, 2015.
U.S. Appl. No. 13/141,977, filed Jun. 23, 2011, MacKay et al.
U.S. Appl. No. 14/325,134, filed Jul. 7, 2014, MacKay et al.
U.S. Appl. No. 14/743,691, filed Jun. 18, 2015, MacKay et al.
U.S. Appl. No. 14/864,170, filed Sep. 24, 2015, MacKay et al.
Office Action issued in U.S. Appl. No. 13/468,881, dated Sep. 4, 2013 (13 pgs).
Office Action issued in U.S. Appl. No. 29/455,221, dated Jan. 13, 2014 (10 pgs).
Barefoot, D., "There'll be lies, there'll be tears, a jury of your peers," DarrenBarefoot.com: Dec. 2005, pp. 8-9 (39 pages).
Canadian Office Action issued in application 2,870,544, dated Jan. 19, 2015 (5 pgs).
Cardinal Tracking Inc.—MobileCite brochure, undated (2 pgs).
Digital Payment Technologies—LUKE brochure, undated (4 pgs).
Digital Payment Technologies—LUKE website, https://web.archive.org/web/20061025094839/http:www.digitalpaytech.com/luke.html, Oct. 25, 2006 (5 pgs).
*Duncan Parking Technologies, Inc.* v. *IPS Group Inc.*, Petition for *Inter Partes* Review of U.S. Pat. No. 7,854,310, IPR2016-00067, Oct. 22, 2015 (66 pgs).
*Duncan Parking Technologies.* v. *IPS Group Inc.*, Petition for *Inter Partes* Review of U.S. Pat. No. 7,854,310, IPR2016-00068, Oct. 22, 2015 (64 pgs).
*Duncan Parking Technologies, Inc.* v. *IPS Group Inc.*, Petition for *Inter Partes* Review of U.S. Pat. No. 8,595,054, IPR2016-00069, Oct. 22, 2015 (67 pgs).
*Duncan Parking Technologies, Inc.* v. *IPS Group Inc.*, Petition for *Inter Partes* Review of U.S. Pat. No. 8,595,054, IPR2016-00070, Oct. 22, 2015 (61 pgs).
Duncan Solutions—AutoCITE brochure, 2013 (2 pgs).
Duncan Solutions—Eagle 2100 brochure, 2013 (2 pgs).
Duncan Solutions—Eagle CK brochure, 2013 (2 pgs).
Duncan Solutions—Intermec CN50 webpage, Mar. 8, 2011 (2 pgs).
Duncan Solutions—Motorola MC75 webpage, Mar. 8, 2011 (2 pgs).
Duncan Solutions—VM Pay-by-Space Multi-Space Meter brochure, 2013 (2 pgs).
Exhibit 1003—Declaration of Todd Magness in Support of Petition for *Inter Partes* Review of U.S. Pat. No. 7,854,310, dated Oct. 21, 2015 (70 pgs).
Exhibit 1004—Declaration of Anderson Moore in Support in Petition for *Inter Partes* Review of U.S. Pat. No. 8,595,054, dated Oct. 21, 2015 (19 pgs).
Exhibit 1005—U.S. Appl. No. 60/741,920, filed Dec. 2, 2005 (20 pgs).
Exhibit 1009—Tung, Y., "Design of an Advanced On-street Parking Meter," Thesis, Rochester Institute of Technology, 2001 (75 pgs).
Exhibit 1010—Christian, S.E., "Parking Meter Winding Up for Computer Age," Chicago Tribune, May 19, 1995 (6 pgs).
Exhibit 1011—Associated Press, "New Parking meters based on computer," The San Diego Union, Feb. 1, 1987 (1 pg).
Exhibit 1012—Lunden, J., Good Morning America transcript, Nov. 6, 1986 (3 pgs).
Exhibit 1013—LUKE Parking Station ad (p. 28), Parking Today, vol. 10, No. 4, Apr. 2005 (64 pgs).
Exhibit 1014—Blass, E., "Changing times," Lansing State Journal, Feb. 19, 1987 (1 pg).
Exhibit 1015—Gabriele, M.C., "Electronic Parking Meters Rival Mechanical Units," American Metal Market/Metalworking News, Sep. 29, 1986 (1 pg).
Exhibit 1016—Sandler, L., "Lovely VISA, meter maid: Use credit card to park," Milwaukee Journal Sentinel, Jun. 13, 2005 (1 pg).
Exhibit 1017—Item for Finance Committee, "Capital Works Reserve Fund, Head 708—Capital Subventions and Major Systems and Equipment," FCR(Mar. 2002)18, May, 24, 2002 (15 pgs).
Exhibit 1018—Anonymous, "Happy %#E! Anniversary, First Parking Meter Installed Jul. 16, 1935," The Expired Meter News, Views, Information on Driving in Chicago, Jul. 16, 2009 (10 pgs).
Exhibit 1019—Anonymous, Parking Meter Pateneted 72 Years Ago Today, The Expired Meter News, Views, Information on Driving in Chicago, May 24, 2010 (6 pgs).
Exhibit 1020—U.S. Pat. No. 2,118,318 to Magee, May 24, 1938 (11 pgs).
Exhibit 1032—U.S. Pat. No. 5,570,771 to Jacobs, Nov. 5, 1996 (29 pgs).
Exhibit 1034—Anonymous, "Smart Cards and Parking," TC-06001, Smart Card Alliance Transportation Council White Paper, Jan. 2006 (52 pgs).
Exhibit 1037—Catalog Entry for Exhibit 1009, Tung Y., "Design of an advanced on-street parking meter," Oct. 18, 2015 (2 pgs).
Exhibit 1038—POM Parking Meters website, Oct. 20, 2015 (4 pgs).
International Search Report issued in application No. PCT/US2012/037229, dated Jan. 28, 2013 (6 pgs).
International Search Report issued in application No. PCT/US2012/037205, dated Oct. 4, 2012 (3 pgs).
Notice of Allowance issued in U.S. Appl. No. 14/325,134, dated Feb. 3, 2016 (14 pgs).
Notice of Allowance issued in U.S. Appl. No. 29/477,339, dated Apr. 1, 2015 (3 pgs).
Notice of Allowance issued in U.S. Appl. No. 29/477,402, dated Aug. 3, 2015 (3 pgs).
Notice of Allowance issued in U.S. Appl. No. 29/477,405, dated Apr. 1, 2015 (10 pgs).

(56) References Cited

OTHER PUBLICATIONS

Office Action issued in U.S. Appl. No. 14/325,134, dated Nov. 24, 2015 (22 pgs).
Office Action issued in U.S. Appl. No. 14/698,806, dated Dec. 14, 2015 (9 pgs).
Office Action issued in U.S. Appl. No. 29/477,201, dated Apr. 9, 2015 (9 pgs).
Office Action issued in U.S. Appl. No. 29/477,204, dated Apr. 9, 2015 (9 pgs).
Office Action issued in U.S. Appl. No. 29/477,321, dated May 15, 2015 (9 pgs).
Office Action issued in U.S. Appl. No. 29/477,324, dated Apr. 23, 2015 (9 pgs).
Office Action issued in U.S. Appl. No. 29/477,329, dated May 22, 2015 (11 pgs).
Office Action issued in U.S. Appl. No. 29/477,402, dated Apr. 9, 2015 (15 pgs).
Photo Violation Technologies—Revolutionizing the Industry by Perfecting How People Park, https://web/archive.org/web/20070628195927/http://www.photoviolation.com/, Jun. 28, 2007 (50 pgs).
Photo Violation Technologies Corp.—Products, Oct. 2, 2015 (3 pgs).
Spyker, R.L., "Predicting capacitor run time for a battery/capacitor hybrid source," Power Electronic Drives and Energy Systems for Industrial Growth. 1998, abstract only (2 pgs).
Transcript & Screenshots of https://web.archive.org/web/20080222104246/http://www.photoviolation.com/videos/PCM.wmv, Photo Violation Technologies Corp.—"ParkCardMaster™ System," undated (6 pgs).
Transcript & Screenshots of https://web.archive.org/web/20080222104246/http://www.photoviolation.com/videos/HHU.wmv, Photo Violation Technologies Corp.—"PhotoViolationHandHeldUnit™," undated (7 pgs).
Transcript & Screenshots of https://web.archive.org/web/20080222104246/http://www.photoviolation.com/videos/PBS.wmv, Photo Violation Technologies Corp.—"The PBS Solution," undated (10 pgs).
Transcript & Screenshots of https://web.archive.org/web/20080222104246/http://www.photoviolation.com/videos/PVM.wmv, Photo Violation Technologies Corp.—"The PVM Solution," undated (17 pgs).
Viedo link, "ParkCardMaster™ System," https://web.archive.org/web/20080222104246/http://www.photoviolation.com/videos/PCM.wmv, Photo Violation Technologies Corp., undated.
Viedo link, "PhotoViolationHandHeldUnit™," https://web.archive.org/web/20080222104246/http://www.photoviolation.com/videos/HHU.wmv, Photo Violation Technologies Corp., undated.
Viedo link, "The PBS Solution," https://web.archive.org/web/20080222104246/http://www.photoviolation.com/videos/PBS.wmv, Photo Violation Technologies Corp., undated.
Video link, "The PVM Solution," https://web.archive.org/web/20080222104246/http://www.photoviolation.com/videos/PVM.wmv, Photo Violation Technologies Corp., undated.
Written Opinion issued in application No. PCT/US2012/037205, dated Oct. 4, 2013 (5 pgs).
Written Opinion issued in application No. PCT/US2012/037229, dated Jan. 28, 2013 (6 pgs).
US 8,636,133, 01/2014, MacKay et al. (withdrawn)

* cited by examiner

FIG. 1 - Prior Art

PARKING METER WITH CONTACTLESS PAYMENT

CROSS REFERENCE TO RELATED APPLICATIONS

This application claims benefit by way of PCT patent application No. PCT/CA12/000191, filed Mar. 2, 2012; U.S. patent application No. 13/410,831, filed Mar. 2, 2012; Canadian patent application No. 2,733,110, filed Mar. 3, 2011; and Canadian patent application No. 2,756,489, filed Oct. 28, 2011.

TECHNICAL FIELD

The present disclosure relates to parking meters and in particular to parking meters having contactless payment options.

BACKGROUND

Parking meters come in many shapes and sizes but are generally divided into two main types or classes: multi-space parking meters which are typically larger devices capable of managing the parking payment and control for typically six or more, or possibly even hundreds of parking spaces; and, single-space parking meters which are typically small devices capable of managing the parking payment and control of a single parking space, but also sometimes additional spaces, such as two, four, or six spaces which are located in close proximity to the parking meter.

For example, FIG. 1 depicts a conventional single space parking meter 100 installed on a pole 102. Single space parking meter mechanisms are typically installed in a protective housing on a pole 102 near a parking space. The protective housing components, which are directly exposed to the elements and the public, are traditionally separate from the actual parking meter mechanism (not shown). The protective housing components of previous single space parking meters 100 typically comprise a lower housing 104 that receives a removable parking meter mechanism. A cover cap 106 is placed over the parking meter mechanism and secured to the lower housing 104. The cover cap 106 may comprise a semi-circular opening no, covered by a transparent material through which a display of the parking meter mechanism is visible. In some previous single space parking meters the display is set back from the exterior surface of the cover cap 106, or the transparent material covering the opening. The lower housing 104 is typically secured to a coin vault 108 for storing coins received during operation of the parking meter 100. The coin vault 108 may be secured to the pole 102. The parking meter 100 is operated by inserting payment, either in the form of coins or payment cards such as credit cards, chip cards or electronic purse cards, into the parking meter 100 which then displays and counts down the purchased amount of parking time.

Parking meters are often located in unattended areas, and as such vandalism, tampering and theft are of concern. The protective housing, which typically comprises the lower housing 104 and the cover cap 106, provides protection for the components of the parking meter mechanism from vandalism, tampering and theft, as well as protection from the environment.

Numerous credit card companies have now issued contactless payment cards which allow the card holder to make payment at devices with the appropriate contactless card readers. Previous parking meters have employed contactless card readers that allowed receiving payment from a card without the need of the card reader coming into contact with the payment card. However, previous parking meters have incorporated the contactless card reader as a separate component or with other payment means, such as the coin chute. Alternatively, the card reader could replace other payment means entirely. Although the incorporation of contactless card readers in parking meters may provide flexibility in the payment options available to a user of the parking meter, the position of the contactless card reader within the parking meter provided unsatisfactory user interactions. For example, when a contactless card reader is positioned away from a display of a parking meter, it has been difficult to provide clear instructions using the display indicating where to make payment with the contactless card reader. In addition, a parking meter having a contactless card reader positioned away from a display may require a separate or additional opening in the housing of the parking meter, which may lead to more costly, complex and time consuming manufacturing of the housing, and may make the parking meter more susceptible to vandalism, tampering or theft.

There is therefore a need for a parking meter having an improved implementation for contactless payments.

SUMMARY

There is disclosed a parking meter comprising components for providing parking meter functionality; a display for displaying parking meter information; a metal housing for protecting the parking meter components from an environment, the housing comprising a display aperture through which the display is visible; and an antenna for a contactless payment reader arranged in or on the parking meter in close proximity to the display.

There is further disclosed a removable parking meter mechanism comprising components for providing parking meter functionality; a display for displaying parking to information; and an antenna for a contactless payment reader arranged in close proximity to the display.

BRIEF DESCRIPTION OF THE DRAWINGS

Further features and advantages will become apparent from the following detailed description, taken in combination with the appended drawings, in which.

DETAILED DESCRIPTION

Figure 1:
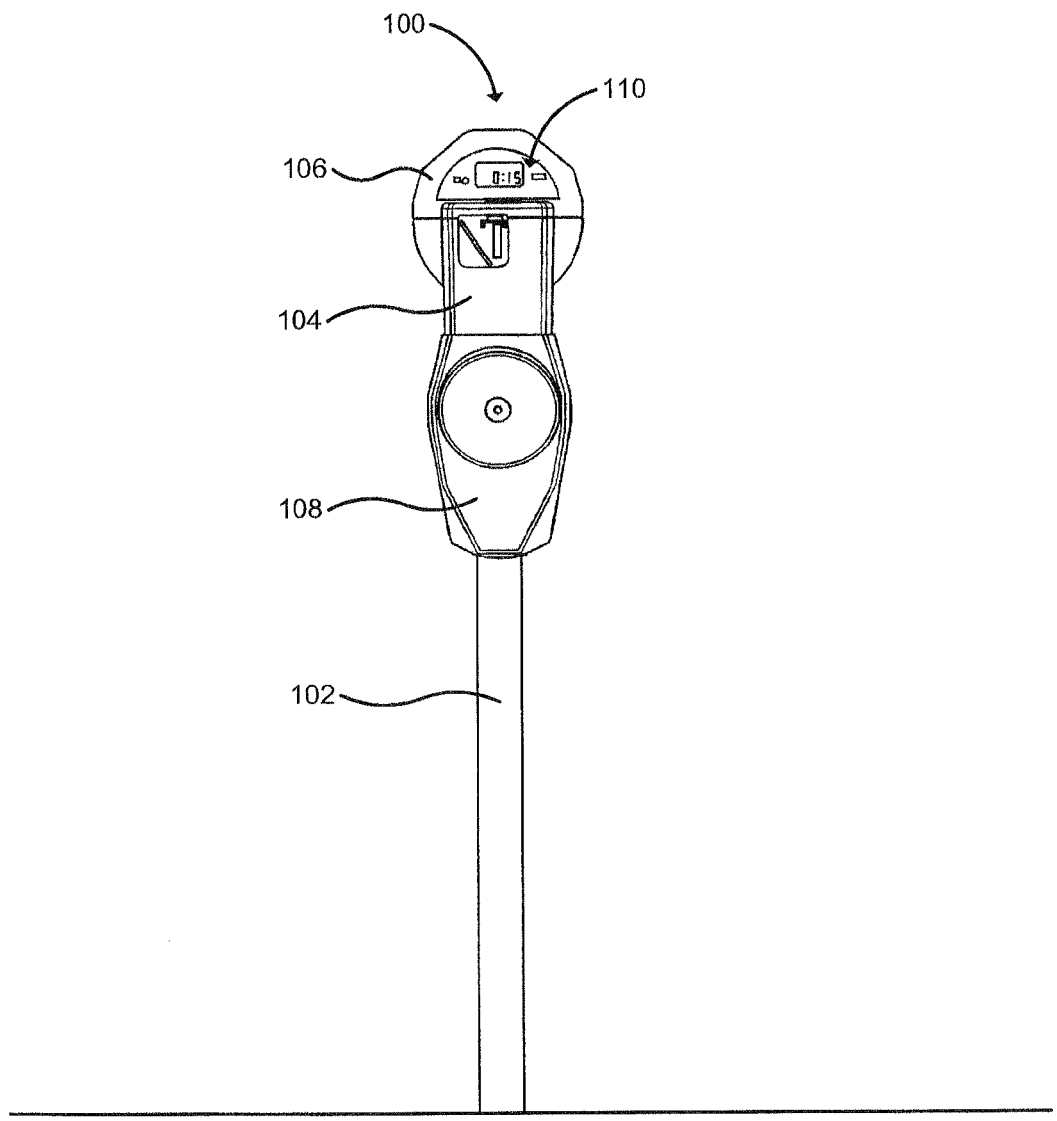
FIG. 1 is a schematic showing an installed previous single space parking meter.
Figures 2, 3:
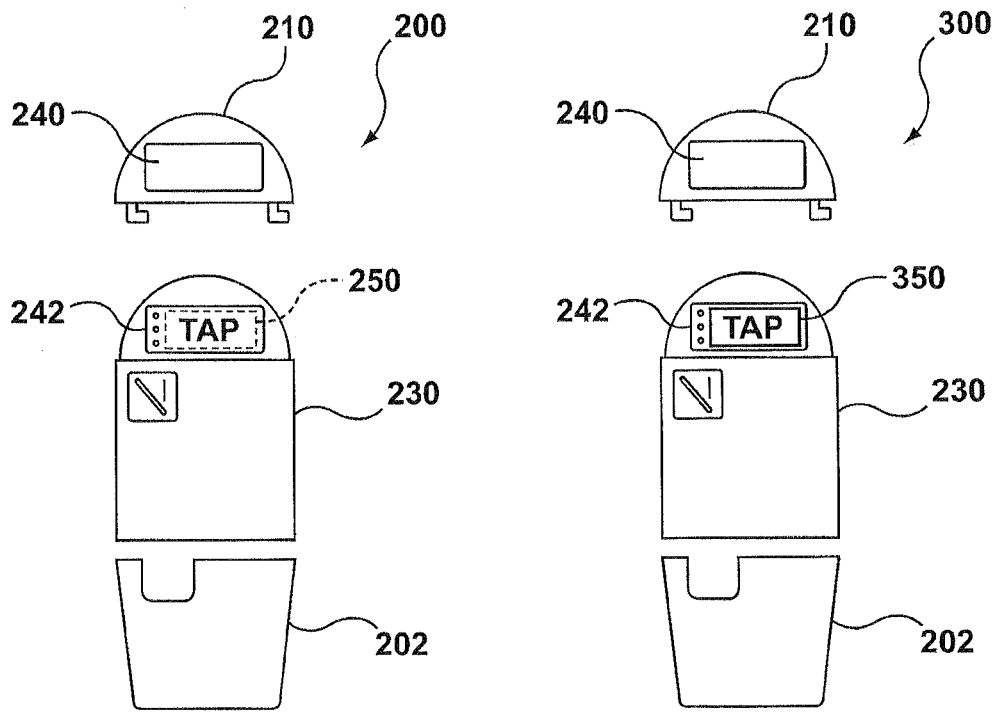
FIG. 2 depicts illustrative components of a single space parking meter including contactless payment means.
FIG. 3 depicts illustrative components of a further single space parking meter including contactless payment means.

FIG. 2 depicts illustrative components of a single space parking meter. The single space parking meter zoo comprises a lower housing 202, a cover housing 210 and a removable parking meter mechanism 230. The parking meter mechanism 230 may be partially received within the lower housing 202, which is typically secured to a coin vault (not shown) that is mounted on a pole (not shown) when in use.

When the parking meter 200 is assembled, that is, the parking meter mechanism 230 is at least partially placed in the lower housing 202 and the cover housing 210 is secured and/or locked to the lower housing 202, the parking meter mechanism 230 is enclosed in a protective housing and protected from the environment, vandalism, tampering, theft or other unauthorized access. When assembled, the parking meter 200 includes a display opening 240 through which a display 242 of the parking meter mechanism 230 is visible. The parking meter mechanism 230 may include a contactless payment reader for providing payment using a contactless payment card issued by the parking operator or by a bank or financial institution under one of the credit card brands, or a card conforming to the ISO 14443 standard, although other types of near field communication (NFC) are possible such as an NFC enabled mobile phone, smartphone, wrist watch, or other appropriate tag, or token.

The contactless payment reader comprises a reader module (not visible) comprising electronics for controlling the operation of the contactless payment reader. The reader module is coupled to a contactless reader antenna 250. The contactless reader antenna 250 may be provided as a thin flexible ring of copper wiring around the perimeter of a viewing area of the display. The contactless reader antenna 250 is depicted by a dashed line in FIG. 2 as it is located behind the display 242. The contactless reader may be provided on a single board or component that includes both the contactless reader module and the contactless reader antenna 250. Alternatively, the contactless reader module may be separate from the contactless reader antenna 250 and connected to it by a wire or wires. The contactless reader module is in communication with electronics of the parking meter mechanism responsible for the overall operation of the parking meter. Alternatively, the contactless reader module may be incorporated into the electronics of the parking meter mechanism responsible for the overall operation of the parking meter.

When a contactless payment card, or other contactless payment device, is placed in close proximity to the contactless reader antenna 250, the contactless reader module can read information from the contactless payment card, which can be provided to the electronics of the parking meter mechanism in order to receive payment. In order to process the payment from the contactless payment card, the electronics of the parking meter mechanism may communicate with a remote server using wired or wireless communication technologies in order to receive authorization of the transaction.

Previous parking meters have included a contactless type payment method using a contactless payment reader. However, there were disadvantages associated with the placement of contactless payment readers, or more particularly the contactless reader antenna, within previous parking meters. For example, the difficulties included difficulty in providing adequate space to place a contactless payment reader as well as difficulty in providing instructions to a user, while still offering other payment means. Having the contactless reader antenna located away from the display, as in previous parking meters, makes it more difficult to provide instructions to a user for where to place the contactless payment card for payment.

The parking meter mechanism 230 includes a contactless payment reader that has a contactless reader antenna 250 located directly behind the display 242, which allows for payment by way of a contactless payment card or device (not shown). The display 242 is located in close enough proximity to the exterior of the parking meter 200 such that the contactless payment reader is able to adequately read contactless payment cards or devices placed over, or in close proximity to, the display 242, and so the contactless reader antenna 250. The maximum read distance between the contactless payment card or device and the contactless reader antenna is typically a function of the size of the contactless reader antenna 250, the presence of any material, and its nature if present, between, or in the vicinity of, the contactless reader antenna and the contactless payment card of device, and other operating conditions of the parking meter 200. The distance in between the contactless reader antenna and the contactless payment card or device, as well as properties of any intervening material, may affect the probability of successfully reading the contactless payment card or device. Different applications may have different acceptable reading success rates and as such, may have varying acceptable distances between the contactless reader antenna and the contactless payment card or device. An adequate success rate for reading of contactless payment cards or devices by the contactless payment reader through the display 242 may be accomplished even with a double layer of a clear protective cover placed over the display 242. Since the contactless reader antenna 250 is placed behind the display 242, which is significantly more transparent to the wireless signals used by the contactless payment reader than housing components of the parking meter 200, which are typically made of metal, no additional openings or apertures need to be included in the housing components to provide adequate operation of the contactless payment reader. Thus, by placing the contactless payment reader behind the display 242, in addition to providing a convenient location for placing the contactless payment device to initiate payment, it is possible to provide housing components that provide greater security and environmental protection.

When making payment using the contactless payment reader, the display 242 may be used to display a logo, graphic and/or directions such as "Tap Here" or simply "Tap" as depicted, providing clear and convenient payment instructions to the user. The contactless reader antenna 250 is located sufficiently close to the display so that a user placing the contactless payment card or device in the vicinity of the display 242 as instructed by the display will have an acceptable success rate for reading the contactless payment card or device.

By placing the contactless reader antenna 250 behind the display 242, the amount of space required to offer this method of payment may be reduced, as the need of an additional opening or aperture in the housing components is eliminated. In addition, the display 242 and possible protective covering of the display 242 provide protection and ruggedness so as to allow the contactless payment reader to be deployed in unattended single space parking meters without the need for additional protection. Additionally, by placing the contactless reader antenna behind the display 242, the physical packaging of the parking meter mechanism 230 may be reduced to provide more freedom in the design of the parking meter 200, possibly allowing a smaller more appealing single space parking meter, which may be desirable given the large number of single space parking meters that may be present on a single street or block.

Placing the contactless reader antenna 250 behind the display 242 as described above may work acceptably well if the display 242 does not have a sufficient amount of metal to significantly impeded the RF signals. However, some displays, for example colour displays, may have a metal backing, impeding the transmission of RF signals.

FIG. 3 depicts illustrative components of a single space parking meter. The parking meter 300 is similar to the parking meter 200 described above; however, the contactless reader antenna 350 is placed on the front of the display 242. The contactless reader antenna 350 may be placed around the perimeter of an active section of the display that displays information in order to prevent obscuring the view of the display. The contactless reader antenna 350 on the front of the display 242 may be in sufficiently close proximity to the display 242 so that a contactless payment card or device placed in the vicinity of the display 242 as instructed will have an acceptable reading success rate.

The opening 240 in the parking meter housing, through which the display 242 is visible when the parking meter 300 is assembled, also allows the transmission and reception of the required RF signals at the contactless reader antenna 350 for the operation of the contactless payment. The opening 240 is sized so that the RF signals can pass through a non-metallic material used to seal the opening 240. As a result, the RF signals do not need to pass through the metallic housing, providing improved operation of the contactless payment reader.

Figure 4:
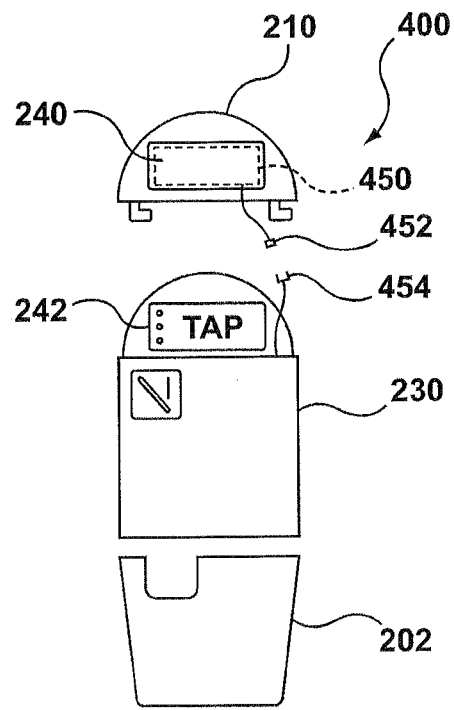
FIG. 4 depicts illustrative components of a further single space parking meter including contactless payment means.

FIG. 4 depicts illustrative components of a single space parking meter. The parking meter 400 is similar to the parking meters 200 and 300 described above; however, the contactless reader antenna 450 is placed on the interior of a material used to seal or cover the opening 240 in the parking meter housing through which the display 242 is visible. Typically, the external housing of the parking meter 400 is made of metal, which attenuates RF signals. The opening 240 is typically sealed using a transparent or semi-transparent material such as Lexan. The material used to enclose the opening 240 is typically transparent or semi-transparent to RF signals.

As depicted in FIG. 4, the contactless reader antenna 450, represented by a dashed line, is placed on the interior side of the material sealing the opening 240. The cover 210 may need to be separated from a lower portion 202 of the parking meter 400 in order to remove the parking meter mechanism 230. The contactless reader antenna 450 may be attached to the contactless reader module of the removable parking meter mechanism 230 by a detachable connection 452, 454. As such, when removing the cover 210, the contactless reader antenna 450 can be detached from the removable parking meter mechanism 230 and then reattached when assembling the parking meter 400.

Figure 5:
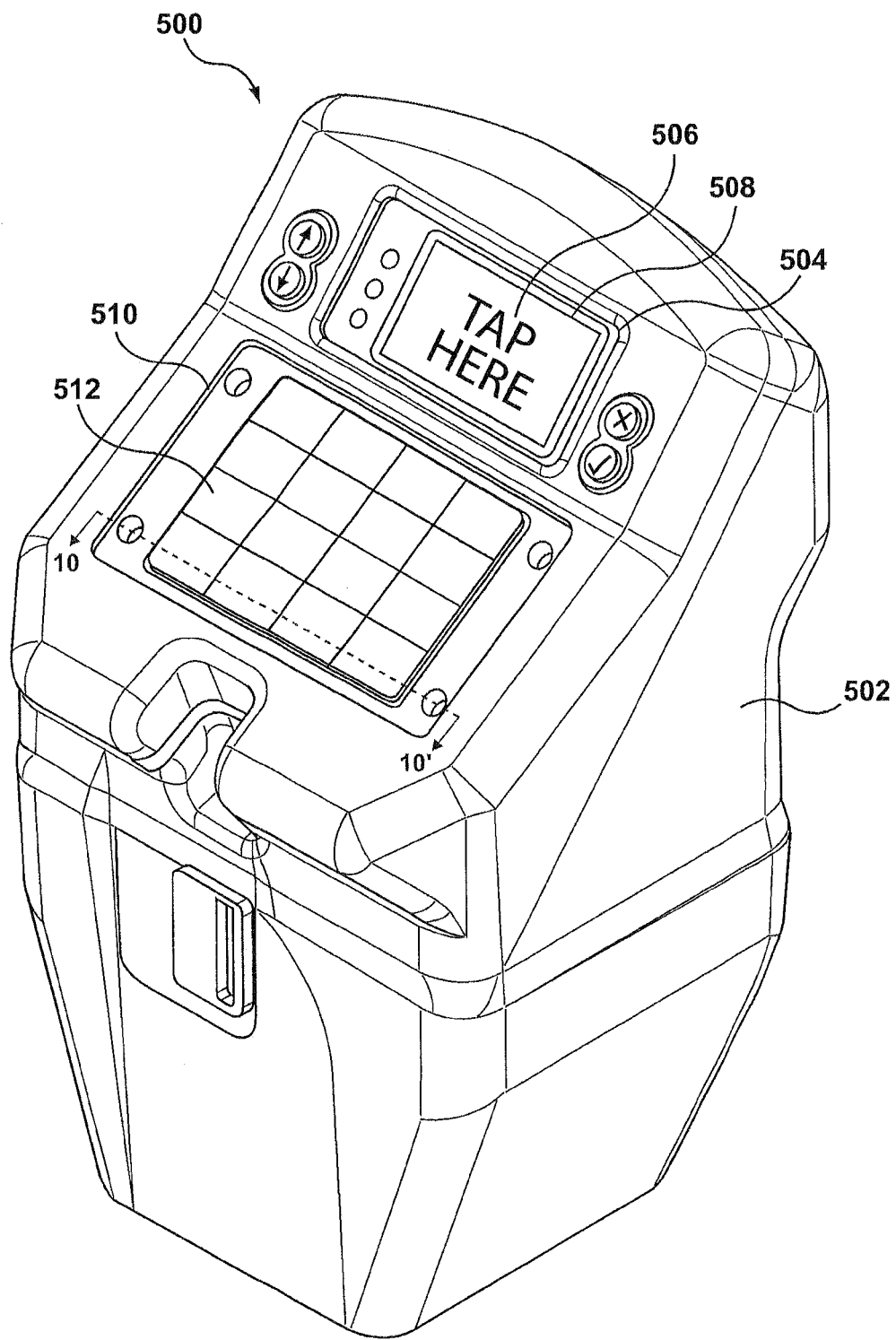
FIG. 5 depicts illustrative components of a further single space parking meter including contactless payment means.

FIG. 5 depicts illustrative components of a single space parking meter. The parking meter 500 comprises a meter housing 502 that encloses a parking meter mechanism and protects it from the environment and vandalism. The meter housing 502 is typically made out of a metal or metal alloy and comprises one or more apertures providing windows to internal components, including a solar panel opening 510 through which a solar panel 512 may be visible. As depicted, the meter housing 502 includes a display opening 504 through which a display 506 is visible when the parking meter 500 is assembled. The display opening 504 in the metal housing 502 is typically sealed with a transparent or semi-transparent protective material such as Lexan. The parking meter 500 may include a solar panel opening 510 in the housing 502 in which a solar panel 512 can sit, or through which a solar panel is visible.

The display 506 is located behind the display opening 504 so that it is viewable when the parking meter 500 is assembled. The display 506 includes a contactless reader antenna 508 surrounding a perimeter of the display 506. The reader antenna 508 is located within the display opening 504, providing a transmission path between the antenna 508 and the contactless payment device that is not impeded by the metal of the meter housing 502. Although described as being located around a perimeter of the display 506, it is contemplated that the contactless reader antenna 508 could be located in different locations in or on the parking meter and arranged in sufficiently close proximity to the display 506 so that a contactless payment device placed in the vicinity of the display 506 has an acceptable success rate for reading the contactless payment device.

Figure 6:
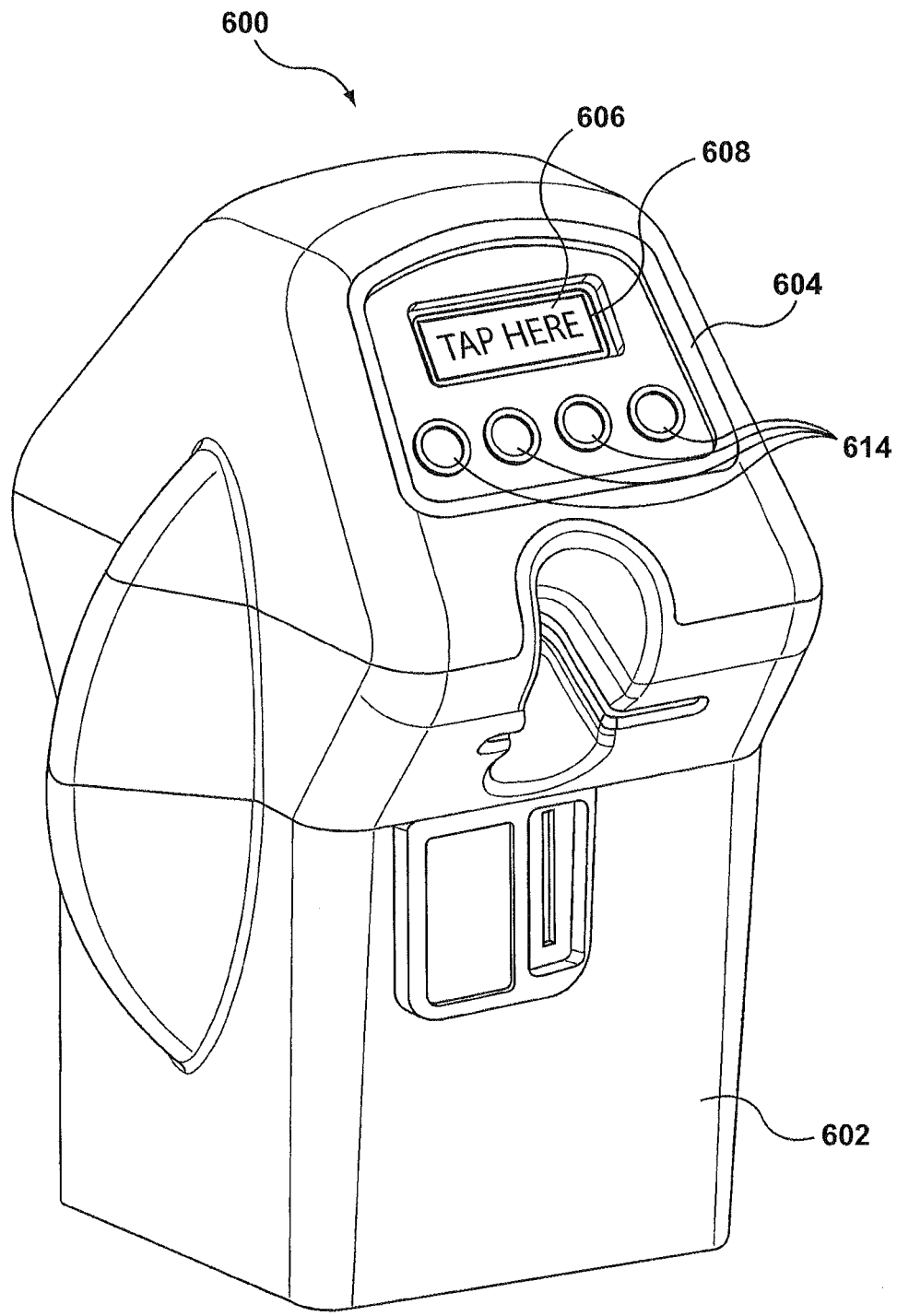
FIG. 6 depicts illustrative components of a further single space parking meter including contactless payment means.

FIG. 6 depicts illustrative components of a single space parking meter. The parking meter 600 comprises a meter housing 602 that encloses a parking meter mechanism and protects it from the environment and vandalism. The meter housing 602 is typically made out of a metal or metal alloy and comprises one or more apertures providing windows to internal components. As depicted, the meter housing 602 includes an opening 604 through which a display 606 is visible when the parking meter 600 is assembled. The opening 604 in the metal housing 602 is sized such that the display 606 is visible, and a section which incorporates a plurality of buttons 614 for controlling the parking meter 600 is exposed.

The display 606 is located behind the opening 604 so that it is viewable when the parking meter 600 is assembled. The display 606 includes a contactless reader antenna 608 surrounding a perimeter of the display 606. The reader antenna 608 is located within the opening 604 which is covered by a material providing a low attenuation of RF signals, providing a transmission path between the antenna 608 and the contactless payment device that is not impeded by the metal of the meter housing 602.

Although described as being located around a perimeter of the display 606, it is contemplated that the antenna 608 could be located in different locations in or on the parking meter 600 and arranged in sufficiently close proximity to the display 606 so that a contactless payment device placed in the vicinity of the display 606 has an acceptable success rate for reading a contactless payment device.

Figure 7:
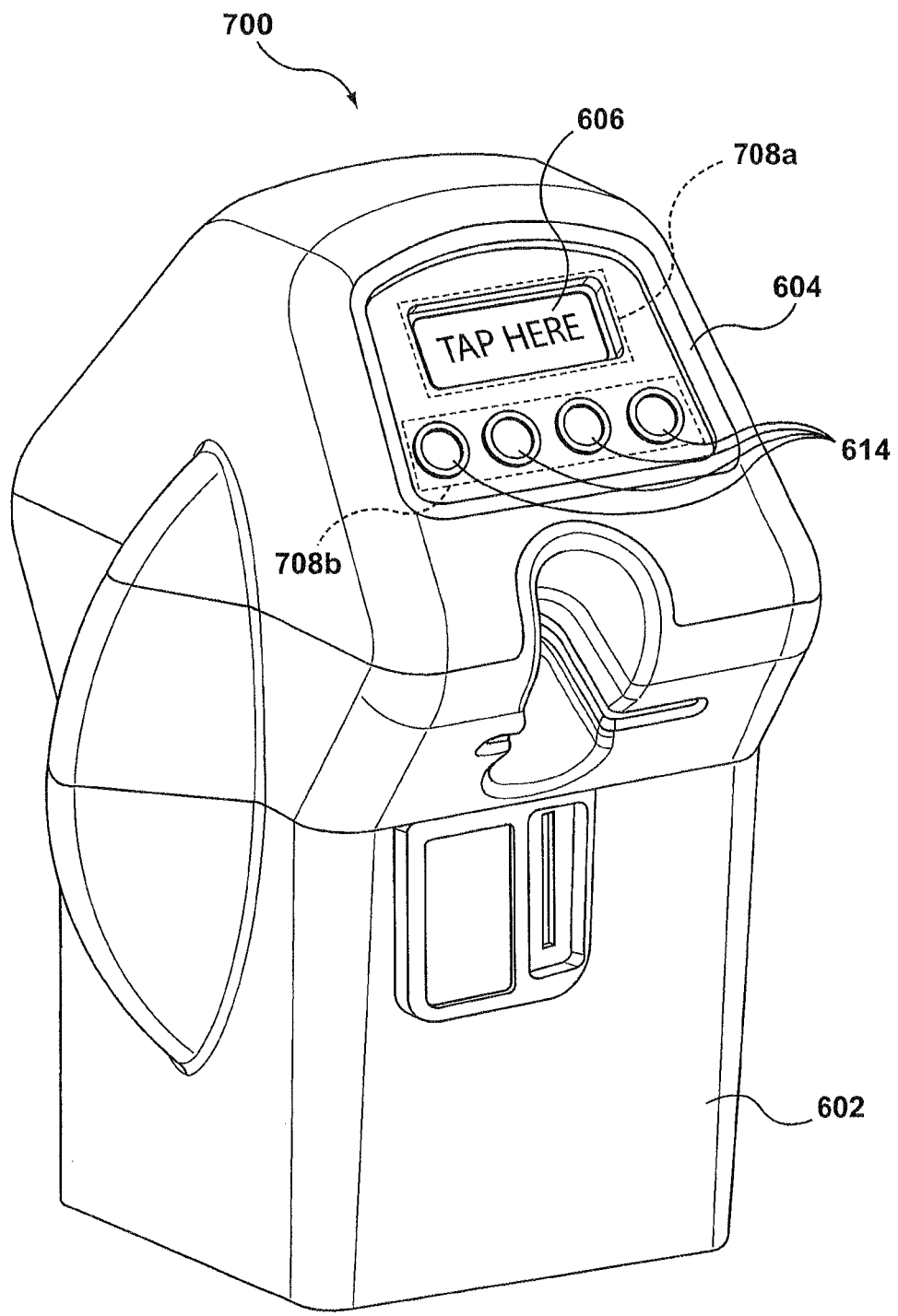
FIG. 7 depicts illustrative components of a further single space parking meter including contactless payment means.

FIG. 7 depicts illustrative components of a single space parking meter. The parking meter 700 is substantially similar to parking meter 600; however, the contactless reader antenna 708a is depicted as being located on an interior side of the material used to seal or cover the opening 604 and in close proximity to the display 606. Additionally or alternatively, a second contactless reader antenna 708b may be included on the interior side of the material used to seal or cover the opening 604 and surrounding the input components (i.e., buttons) 614 in close proximity to the display 606. With the contactless reader antenna 708a or 708b located on the interior side of the material used to seal or cover the opening 604, it may be connected to the electronics of the parking meter mechanism using a detachable connection.

Although described as being located around a perimeter of the display 606, it is contemplated that the antenna 708a could be located in different locations in or on the parking meter 700 and arranged in sufficiently close proximity to the display 606 so that a contactless payment device placed in the vicinity of the display 606 has an acceptable success rate for reading a contactless payment device. Likewise, although described as being located around the input components 614, it is contemplated that the antenna 708b could be located in different locations in or on the parking meter 700 and arranged in sufficiently close proximity to the display 606 so that a contactless payment device placed in the vicinity of the display 606 has an acceptable success rate for reading a contactless payment device.

Various possible positions of the antenna within the opening of the parking meter have been described above with reference to FIG. 7. Although the possible positions were described with regards to a single opening in the parking meter, a contactless reader antenna may also be positioned within or about a second opening separate from the opening for the display and still be in sufficiently close proximity to the display to facilitate clear payment instructions. For example, and with regards to FIG. 5, the contactless reader antenna could be placed in proximity to the solar panel opening 510, on the solar panel 512, on a cover of the solar panel opening 510, over the top surface of the solar panel 512, or a combination of one or more of the foregoing.

Alternatively, the contactless reader antenna could be placed on an exterior side of the parking meter, for example, over a protective cover of the display opening 504 or the solar panel opening 510. If the contactless reader antenna is placed on the exterior of the parking meter, it may be located at the same height, or slightly elevated relative to the metal housing surrounding the opening. The contactless reader antenna may be protected by a plastic bezel that encapsulates the contactless reader antenna and securely attaches to the parking meter.

Although the solar panel opening is described above as an opening, it may be provided by an indentation such that a solar panel and covering may rest flush with the rest of the housing. If the solar panel opening is provided by an indentation in the metal housing, the properties of the contactless reader antenna and/or the contactless reader module may be adjusted in order to account for the location of the metal.

Figure 8:
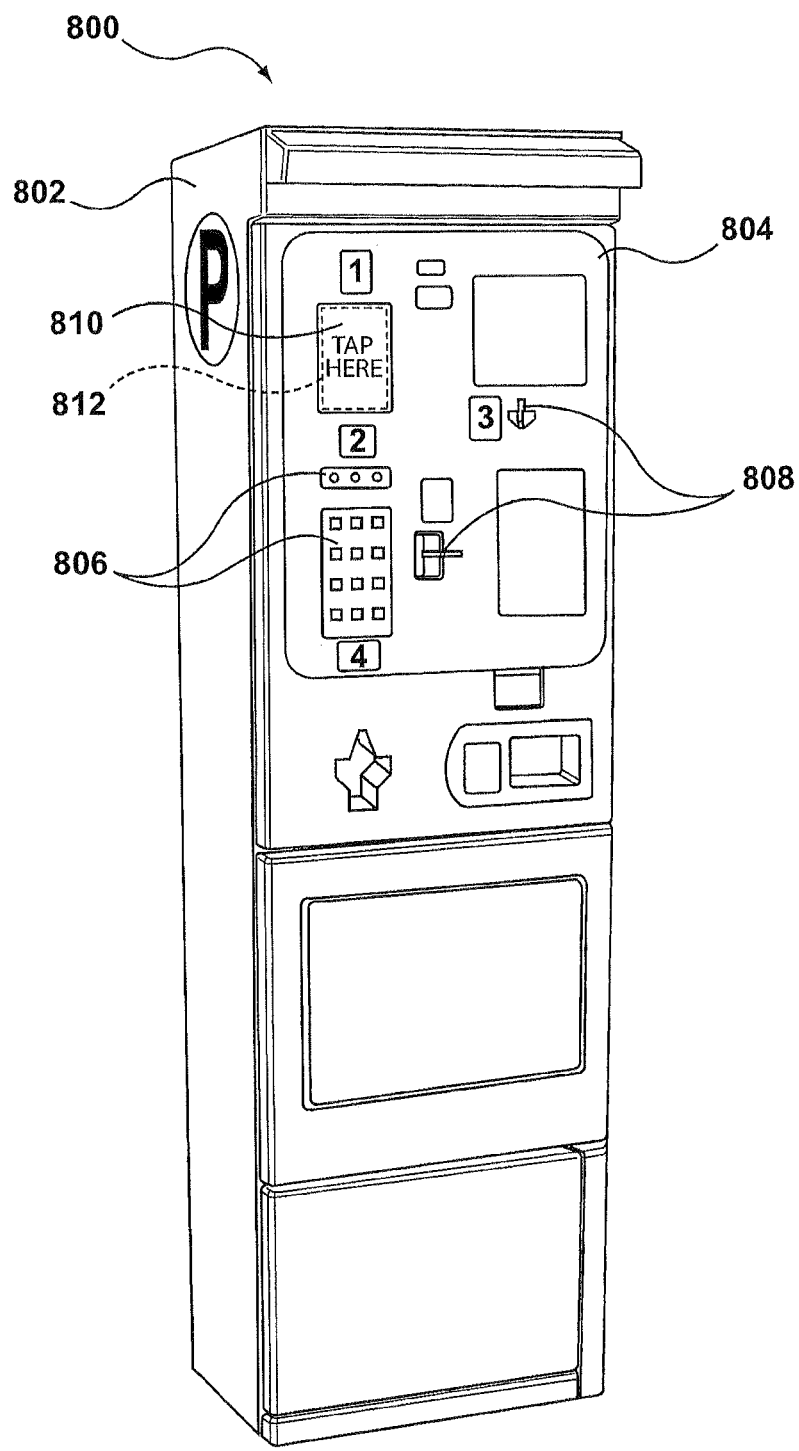
FIG. 8 depicts illustrative components of a multi-space parking meter including contactless payment means.

FIG. 8 depicts illustrative components in a multi-space parking meter. The multi-space parking meter 800 provides metering functionality to a plurality of parking spaces. The multi-space parking meter 800 may be a pay and display type meter in which payment is made by a user and a printed ticket is displayed on the user's vehicle. Alternatively, the multi-space meter 800 may be a pay by space or pay by plate type of meter, in which payment is made and associated with a specific parking space or license plate. Regardless of the type of multi-space meter, the meter 800 typically comprises a metal cabinet or enclosure 802 that encloses the components of the parking meter. Components of the multi-space meter may be located or mounted within the enclosure 802 at convenient locations. In contrast to a single space meter, where a parking meter mechanism is typically removable as a unit, the mechanism of the multi-space meter may comprise the various components that provide parking meter functionality. The cabinet 802 includes a payment section 804 comprising input means 806 such as buttons and/or keypads, for controlling operation of the parking meter, one or more payment means 808 such as credit card, debit card and/or smart card readers and coin chutes, and a display 810 for displaying parking information. The multi-space parking meter 800 further includes a contactless payment reader that includes a contactless reader antenna 812 located in sufficiently close proximity to the display 810 so that a contactless payment device placed in the vicinity of the display 810 has an acceptable success rate for reading a contactless payment device.

The contactless reader antenna 812 is depicted as being located about a perimeter of the display 810. It is contemplated that the contactless reader antenna 812 could be located in different locations in or on the parking meter 800 and arranged in sufficiently close proximity to the display 810 so that a contactless payment device placed in the vicinity of the display 810 has an acceptable success rate for reading a contactless payment device.

The specific design of the contactless reader antenna may vary depending on numerous factors, including the size of the opening within which the antenna is located, the proximity of the contactless reader antenna to the metal of the parking meter housing, whether or not the opening has a metal backing, etc. Further, the wires or wire traces forming the contactless reader antenna may also vary, for example, if the contactless reader antenna is placed over the viewable portion of the display or solar panels, the wires or wire traces may be sufficiently small so as to not obstruct the view of the display, or functioning of the solar panel.

Figure 9:
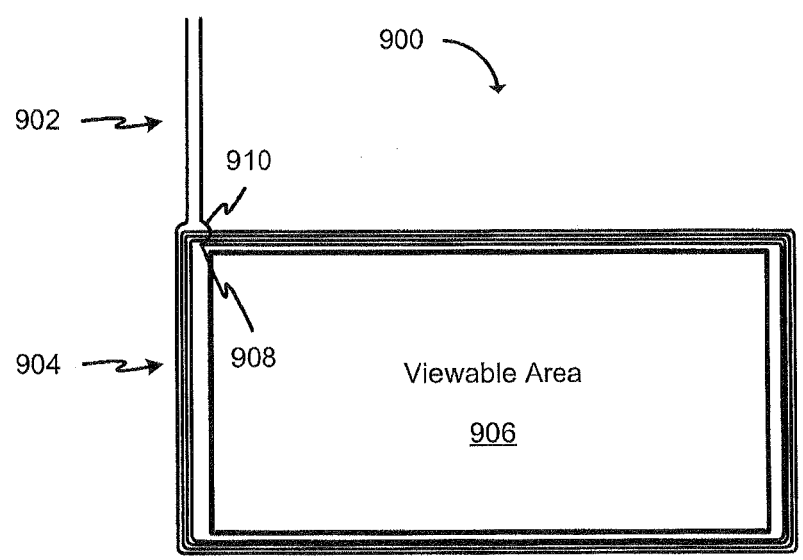
FIG. 9 depicts an illustrative contactless reader antenna.

FIG. 9 depicts an illustrative contactless reader antenna. The contactless reader antenna 900 comprises a plurality of connected traces forming a single electrical wire. As depicted, the contactless reader antenna 900 comprises a tail portion 902 that is used to connect the contactless reader antenna to the contactless reader module and a loop portion 904 that surrounds a viewable area 906 of the display of the parking meter. It is noted that the loop portion 904 terminates at an inner location 908, however this inner location 908 is electrically connected to one of the traces of the tail portion 902. This electrical connection, depicted as wire 910, between the inner location 908 of the loop portion 904 and the tail portion 902 is electrically insulated from the other wires or wires traces of the loop portion 904.

The above has described placement of a contactless reader antenna within a parking meter. Advantageously, the antenna placement has been described as being located in close proximity to a display, facilitating easy instructions for the use of the contactless reader. As will be appreciated, single space parking meters commonly found in North America, and other parts of the world, have a common outer housing made of a high strength metal, such as ductile iron, nickel or zinc. The commonly shaped housing allows different parking meter mechanisms to be received within the housing. While convenient for replacing the parking meter mechanism, the use of a common housing reduces the locations that the contactless reader antenna may be placed, as the lower metal housing is common and generally already installed on the street. As such, it is desirable to locate the contactless reader antenna in a location on the replaceable parking meter mechanism that is not covered by the common lower housing when the parking meter is assembled. As described above, the contactless parking meter antenna may be located within an aperture of an upper housing or cover of the parking meter mechanism. The aperture has been described above as being provided for the parking meter display and/or input controls of the parking meter. Depending upon the size of the display aperture, the efficiency of the contactless reader antenna may be less than ideal. For example, if the display aperture is relatively small, a contactless reader antenna that surrounds the display may still be located in close proximity to the metal housing of the cover. The close proximity of the metal to the contactless antenna may adversely affect the operation of the contactless reader antenna and the antenna may not be able to achieve a desired performance level.

It is possible to locate the contactless reader antenna in a location other than surrounding, or immediately adjacent to, the display. For example, the parking meter 500 includes an opening or aperture 510 for receiving a solar panel 512. As depicted in FIG. 5, the solar panel aperture 510 is relatively large compared to the display opening 504, while still being located in close proximity to the display. It is contemplated that the contactless reader antenna may be located within the solar panel aperture 510.

Figure 10:
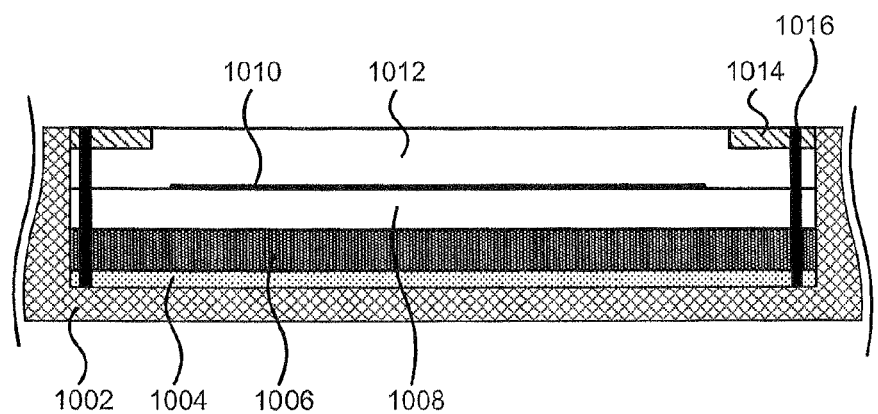
FIG. 10 depicts a cross section of the solar panel aperture of FIG. 5 taken along line 10-10'.
Figure 11:
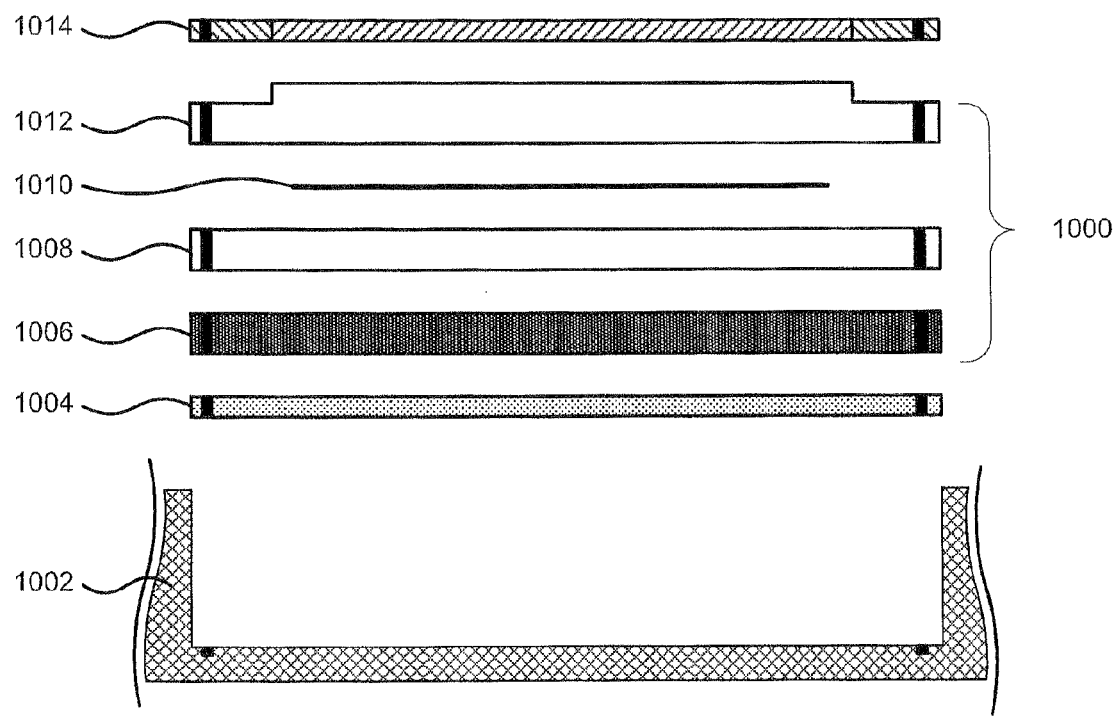
FIG. 11 depicts the component layers within the solar panel aperture of FIG. 10.

FIG. 10 depicts a cross section of the solar panel aperture 510 of FIG. 5 taken along line 10-10'. FIG. 11 depicts the component layers within the solar panel aperture of FIG. 10. As depicted in FIGS. 10 and 11, a solar panel assembly moo located within a solar panel aperture is depicted. As depicted, the solar panel aperture is provided within a metal housing 1002 of the parking meter. The bottom of the solar panel aperture is lined with a radio frequency (RF) shielding material 1004 that absorbs RF signals, such as those radiated by the contactless antenna. The solar panel assembly is received on top of the RF shielding 1004 and includes a solar panel 1006 that is sized to be received within the solar panel aperture. A lower transparent covering 1008, such as a 1/16" Lexan covering, is located on top of the solar panel 1006. The contactless reader antenna 1010, which may be a coiled loop of very fine gauge copper wires shaped in a 2"×3" loop, is located on top of the lower transparent covering 1008. A second transparent covering 1012, such as a 1/16" Lexan covering, may be placed on top of the contactless reader antenna 1010. The solar panel assembly, comprising the solar panel 1006, the first transparent covering 1008, the contactless reader antenna 1010 and the second transparent covering 1012 may be secured in place within the solar panel aperture by a metal covering plate or bezel 1114. The covering plate has an aperture through which light can pass through to the solar panel 1006. The covering plate may be secured in place using one or more screws or bolts 1016 that pass through the solar panel assembly and the RF shielding layer 1004 into the bottom of the solar panel aperture. Although depicted as passing though the different layers, it is contemplated that the individual layers may be sized such that the screws or bolts do not pass through them.

Advantageously, the size of the solar panel aperture allows the contactless reader antenna to be located a sufficient distance away from the surrounding metal housing to provide improved reading characteristics. Further, the placement of the contactless reader antenna 1010 on top of the first transparent covering 1008 and the solar panel 1006 provides a gap between the contactless reader antenna 1010 and the metal 1002 of the bottom of the solar panel aperture. Further, the RF shielding 1004 located in bottom of the solar panel aperture further improves the operation of the contactless reader antenna 1010. While the contactless reader antenna 1010 is located above the solar panel 1006, and so will block some light that would otherwise be incident upon the solar panel, the amount of light blocked may be negligible due to the fine gauge of the copper traces of the contactless reader antenna.

As described above with reference to FIGS. 10 and 11, a contactless reader antenna may be located within a solar panel aperture. As depicted in FIG. 5, the solar panel aperture 510 may be located in close proximity to the display 506 of the parking meter, possibly simplifying the instructions for the use of the contactless reader antenna. For example, the display 506 may be used during a payment to display easy-to-use instructions to a user for effecting contactless payment via the contactless reader antenna located within the proximal solar panel aperture 510. Locating the contactless reader antenna within the solar panel aperture 510 may also provide improved operating characteristics when compared to locating the contactless reader antenna within a possibly smaller display opening.

In addition to providing adequate operating characteristics, it is further desirable to provide a single space parking meter that is simple to manufacture and easy to maintain. It is possible to incorporate the contactless reader antenna and the solar panel in a single component that can be easily installed and/or replaced within a single space parking meter.

Figure 12:
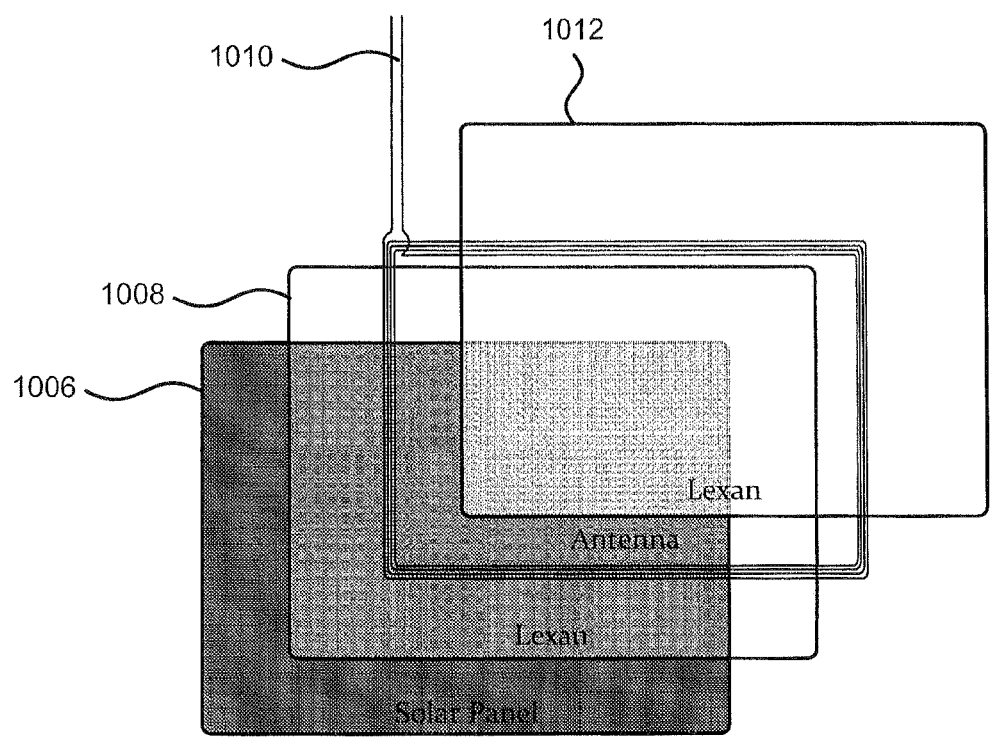
FIG. 12 depicts a layered construction of a solar panel assembly.

FIG. 12 depicts a layered construction of a solar panel assembly as described with reference to FIGS. 10 and 11. The solar panel assembly moo may be manufactured into a single component, allowing easy replacement of the solar panel component in the parking meter. As depicted in FIG. 12, the solar panel assembly moo may comprise a stacked arrangement of the solar panel 1006, the first transparent covering 1008, the contactless reader antenna 1010, and the second transparent covering 1012.

The solar panel assembly may be installed in a parking meter by first placing a layer of RF shielding material in the bottom the solar panel aperture; placing the solar panel assembly within the solar panel aperture, and attaching the contactless reader antenna to electronics of the parking meter as appropriate; and securing the solar panel assembly within the solar panel aperture with a cover plate or bezel.

As described above, a parking meter may be provided with a contactless payment means having a contactless reader antenna arranged within an opening in the metal housing of the parking meter. As described, the antenna may be arranged on either side of a display of the parking meter. Furthermore, the antenna may be arranged on an interior surface of a material sealing an opening in the parking meter housing. A decal may be placed on the covering of the opening to hide the antenna wires while not impeding the transmission of RF signals. Furthermore the individual conductive wires of the antenna of the contactless card reader may be sufficiently small in diameter or fine that even when placed in front of the display they do not significantly interfere with the display visibility, allowing the antenna to be placed over the display. Advantageously, the opening in the metal housing for the display is typically covered with a protective material through which the display is visible, such as Lexan. This material typically provides a low attenuation of RF signals and as such locating the antenna within the opening covered by the low attenuation material provides an improved transmission path, which can increase the likelihood of successfully communicating with a contactless payment device. Furthermore, since the opening is used for viewing the display, and since the display may be used to display a logo, graphic and/or directions such as "tap here", providing clear and convenient payment instructions to the user, it is not necessary to provide an additional opening in the metal housing of the parking meter, which may improve the strength of the parking meter housing and/or possibly simplifying its construction.

Although various embodiments have been described with different placements of the contactless reader antenna, it is contemplated that the antenna could be located in or on the parking meter in different positions or configurations. The antenna should be placed in sufficiently close proximity to the display, when the parking meter is assembled, to provide an acceptable success rate of reading when a contactless payment device is placed in the vicinity of the display. Arranging the antenna in or on the parking meter in close proximity to the display allows clear instructions to be presented to the user on the display, indicating to the user where to place the contactless payment device. For example, the antenna could be located on an exterior side of the parking meter in close proximity to the display.

Various embodiments of parking meters with contactless payment means have been described. The above-described embodiments of the invention are intended to be examples of the present invention and alterations and modifications may be effected thereto, by those of ordinary skill in the art, without departing from the scope of the invention which is defined solely by the claims appended hereto.

What is claimed is:

1. A parking meter comprising:
   components for providing parking meter functionality;
   a display for displaying parking meter information;
   a metal housing for protecting the parking meter components from an environment, the housing comprising a display aperture through which the display is visible; and
   an antenna for a Near Field Communication (NFC) contactless payment reader arranged in or on the parking meter at least partially surrounding or covering at least a portion of the display.

2. The parking meter of claim 1, wherein at least a portion of the antenna comprises a small diameter of conductive wire.

3. The parking meter of claim 2, wherein at least some of the portion of the antenna comprising the small diameter of conductive wire is arranged in front of the display.

4. The parking meter of claim 2, wherein the antenna at least partially surrounds one or more input components that interact with the parking meter.

5. The parking meter of claim 2, wherein the antenna is arranged about a perimeter of the display of the parking meter.

6. The parking meter of claim 1, wherein the antenna is arranged about a perimeter of the display of the parking meter.

7. The parking meter of claim 1, wherein the antenna is arranged on a front side of the display.

8. The parking meter of claim 1, wherein the antenna is arranged behind the display.

9. The parking meter of claim 1, wherein the antenna is connected to a contactless reader module via wires.

10. The parking meter of claim 8, wherein the antenna is arranged on a printed circuit board of a contactless reader module arranged behind the display.

11. The parking meter of claim 1, wherein the antenna at least partially surrounds one or more input components that interact with the parking meter.

12. The parking meter of claim 1, wherein the housing further comprises an additional aperture at least partially surrounding at least a portion of the display and wherein the antenna is located within or about the additional aperture.

13. The parking meter of claim 12, wherein the additional aperture comprises a solar panel aperture housing a solar panel.

14. The parking meter of claim 13, further comprising a solar panel assembly located within the solar panel aperture comprising a stacked assembly of:
   the solar panel;
   a first transparent covering;
   the antenna; and
   a second transparent covering.

15. The parking meter of claim 14, further comprising a radio frequency (RF) shielding material located between the bottom of the solar panel aperture and the solar panel assembly.

16. The parking meter of claim 1, further comprising material sealing the aperture in the housing and providing a low attenuation of radio frequency (RF) signals and wherein the antenna is arranged on an interior surface of the material sealing the aperture.

17. The parking meter of claim 1, wherein the parking meter is a multi-space type parking meter.

18. The parking meter of claim 1, wherein the parking meter is a single space parking meter and the components providing parking meter functionality and the display are provided by a removable parking meter mechanism received within at least a portion of the metal housing.

19. The parking meter of claim 1, further comprising material sealing the aperture in the housing and providing a low attenuation of radio frequency (RF) signals.

20. The parking meter of claim 19, wherein the parking meter is a single space parking meter and the components providing parking meter functionality and the display are provided by a removable parking meter mechanism received within at least a portion of the metal housing, and wherein the antenna is connected to a contactless reader module of the removable parking meter mechanism through a detachable connection to allow separation of at least a portion of the housing supporting the antenna and the removable parking meter mechanism.

21. The parking meter of claim 20, wherein the antenna is arranged on an interior surface of the material sealing the aperture, and wherein the removable parking meter mechanism comprises at least a portion of the housing having the aperture.

22. The parking meter of claim 1, wherein the NFC reader reads payment information from one or more of:
   a credit card;
   a card conforming to ISO 14443 standard;
   an NFC enabled mobile phone;
   an NFC enabled smartphone;
   an NFC enabled wrist watch;
   an NFC tag; and
   an NFC token.

23. A removable parking meter mechanism comprising:
   components for providing parking meter functionality;
   a display for displaying parking information; and
   an antenna for a Near Field Communication (NFC) contactless payment reader at least partially surrounding or covering at least a portion of the display.

24. The removable parking meter mechanism of claim 23, wherein at least a portion of the antenna comprises a small diameter of conductive wire.

25. The removable parking meter mechanism of claim 23, wherein the antenna is arranged about a perimeter of the display.

26. The removable parking meter mechanism of claim 24, wherein at least some of the portion of the antenna comprising the small diameter of conductive wire is arranged in front of the display.

27. The removable parking meter mechanism of claim 23, wherein the antenna is arranged behind the display.

28. The removable parking meter mechanism of claim 27, wherein the antenna is arranged on a printed circuit board of a contactless reader module arranged behind the display.

29. The removable parking meter mechanism of claim 23, wherein the antenna is arranged on a front side of the display.

30. The parking meter of claim 23, wherein the NFC reader reads payment information from one or more of:
   a credit card;
   a card conforming to ISO 14443 standard;
   an NFC enabled mobile phone;
   an NFC enabled smartphone;
   an NFC enabled wrist watch;
   an NFC tag; and
   an NFC token.

* * * * *